(12) United States Patent
Grimm et al.

(10) Patent No.: US 11,845,088 B2
(45) Date of Patent: Dec. 19, 2023

(54) CLASSIFYING APPARATUS, SYSTEMS AND METHODS

(71) Applicant: Superior Industries, Inc., Morris, MN (US)

(72) Inventors: Lafe Grimm, Hancock, MN (US); Shane Hanson, Columbus, NE (US); Paul Ilott, Tyler, TX (US)

(73) Assignee: Superior Industries, Inc., Morris, MN (US)

( * ) Notice: Subject to any disclaimer, the term of this patent is extended or adjusted under 35 U.S.C. 154(b) by 0 days.

(21) Appl. No.: 17/304,680

(22) Filed: Jun. 24, 2021

(65) Prior Publication Data

US 2021/0308690 A1 Oct. 7, 2021

Related U.S. Application Data

(63) Continuation of application No. 16/319,448, filed as application No. PCT/US2017/043276 on Jul. 21, 2017, now Pat. No. 11,059,049, which is a continuation-in-part of application No. 29/591,837, filed on Jan. 24, 2017, now Pat. No. Des. 828,422, (Continued)

(51) Int. Cl.
| | |
|---|---|
| *B07C 5/34* | (2006.01) |
| *B03B 5/34* | (2006.01) |
| *B01D 21/26* | (2006.01) |
| *B04C 5/04* | (2006.01) |
| *B04C 9/00* | (2006.01) |

(52) U.S. Cl.
CPC .............. *B03B 5/34* (2013.01); *B01D 21/267* (2013.01); *B04C 5/04* (2013.01); *B04C 2009/008* (2013.01)

(58) Field of Classification Search
CPC .... B04C 5/02; B04C 5/04; B04C 5/13; B04C 9/00; B04C 2009/002; B04C 2009/008; B03B 5/34; B01D 21/267
See application file for complete search history.

(56) References Cited

U.S. PATENT DOCUMENTS

| | | |
|---|---|---|
| 2,735,547 A | 2/1956 | Vissac |
| 2,757,581 A | 8/1956 | Horace et al. |

(Continued)

FOREIGN PATENT DOCUMENTS

| | | |
|---|---|---|
| CA | 2527058 | 3/2004 |
| GB | 2560517 B | 4/2019 |

(Continued)

OTHER PUBLICATIONS

"Extended European Search Report", EP Application No. 17831951.3, dated Jan. 17, 2020, 7 pages.

(Continued)

*Primary Examiner* — Joseph C Rodriguez
(74) *Attorney, Agent, or Firm* — Todd R. Fronek; Larkin Hoffman Daly & Lindgren, Ltd

(57) ABSTRACT

Hydrocyclones and related apparatus, systems and methods are disclosed for classifying aggregate material. Some embodiments include an inlet head with a spiral inlet having a height and width that vary along the direction of travel of material in the inlet head. Plants incorporating hydrocyclones are disclosed for classifying aggregate material. Some plant embodiments include an overflow container having a weir.

16 Claims, 19 Drawing Sheets

Related U.S. Application Data and a continuation-in-part of application No. 29/591,840, filed on Jan. 24, 2017, now Pat. No. Des. 857,071.

(60) Provisional application No. 62/365,214, filed on Jul. 21, 2016, provisional application No. 62/465,132, filed on Feb. 28, 2017.

(56) References Cited

U.S. PATENT DOCUMENTS

| | | | | |
|---|---|---|---|---|
| 2,816,658 | A | * | 12/1957 | Braun .................... B04C 5/081 55/435 |
| 3,745,752 | A | | 7/1973 | Gallaer |
| 3,850,816 | A | | 11/1974 | Koch |
| 3,883,332 | A | | 5/1975 | Llewelyn et al. |
| 4,222,529 | A | | 9/1980 | Long |
| 4,317,716 | A | | 3/1982 | Liller |
| 4,623,458 | A | | 11/1986 | Hakola |
| 4,664,789 | A | | 5/1987 | Lees et al. |
| D415,182 | S | | 10/1999 | Rogers et al. |
| 6,270,544 | B1 | | 8/2001 | Mencher et al. |
| 7,255,790 | B2 | | 8/2007 | Rogers et al. |
| 7,293,657 | B1 | * | 11/2007 | Kelton .................... B04C 5/081 209/722 |
| 7,347,332 | B2 | | 3/2008 | Hakola |
| 8,104,622 | B2 | | 1/2012 | Soto |
| 8,439,670 | B2 | | 5/2013 | Georg et al. |
| 8,955,691 | B2 | | 2/2015 | Lister |
| 8,991,621 | B2 | | 3/2015 | Harwell et al. |
| D857,071 | S | | 8/2019 | Grimm et al. |
| 11,059,049 | B2 | * | 7/2021 | Grimm .................... B03B 5/34 |
| 2002/0011050 | A1 | | 1/2002 | Hansen et al. |
| 2002/0112998 | A1 | | 8/2002 | Bosman |
| 2005/0103691 | A1 | | 5/2005 | Hakola |
| 2008/0290008 | A1 | | 11/2008 | Hakola |
| 2009/0071880 | A1 | | 3/2009 | Castro |
| 2010/0064893 | A1 | | 3/2010 | Hopper |
| 2017/0173598 | A1 | * | 6/2017 | Sutherland ............. B04C 5/085 |

FOREIGN PATENT DOCUMENTS

| | | |
|---|---|---|
| WO | 02076622 | 10/2002 |
| WO | 2005021162 A1 | 3/2005 |
| WO | 2009089589 A1 | 7/2009 |

OTHER PUBLICATIONS

"International Search Report and Written Opinion", PCT Application No. PCT/US2017/043276, dated Nov. 20, 2017, 23 pages.

He, Y.B., et al., "Effect of Dense Medium Properties on the Separation Performance of a Dense Medium Cyclone", "Minerals Engineering", vol. 7 Nos. 2/3, 1994, pp. 209-221.

European Search Report in European Application No. 21190862.9, dated Dec. 1, 2021, 17 pages.

European Search Report in European Application No. 21190862.9, dated Mar. 4, 2022, 15 pages.

Australian Office Action in Australian Application No. 2017299775, dated Mar. 18, 2022, 2 pages.

* cited by examiner

CLASSIFYING APPARATUS, SYSTEMS AND METHODS

BACKGROUND

Classifying apparatus such as hydrocyclones and classifying plants (e.g., those including hydrocyclones, etc.) are used to wash and/or classify material such as sand.

DESCRIPTION

Figure 1:
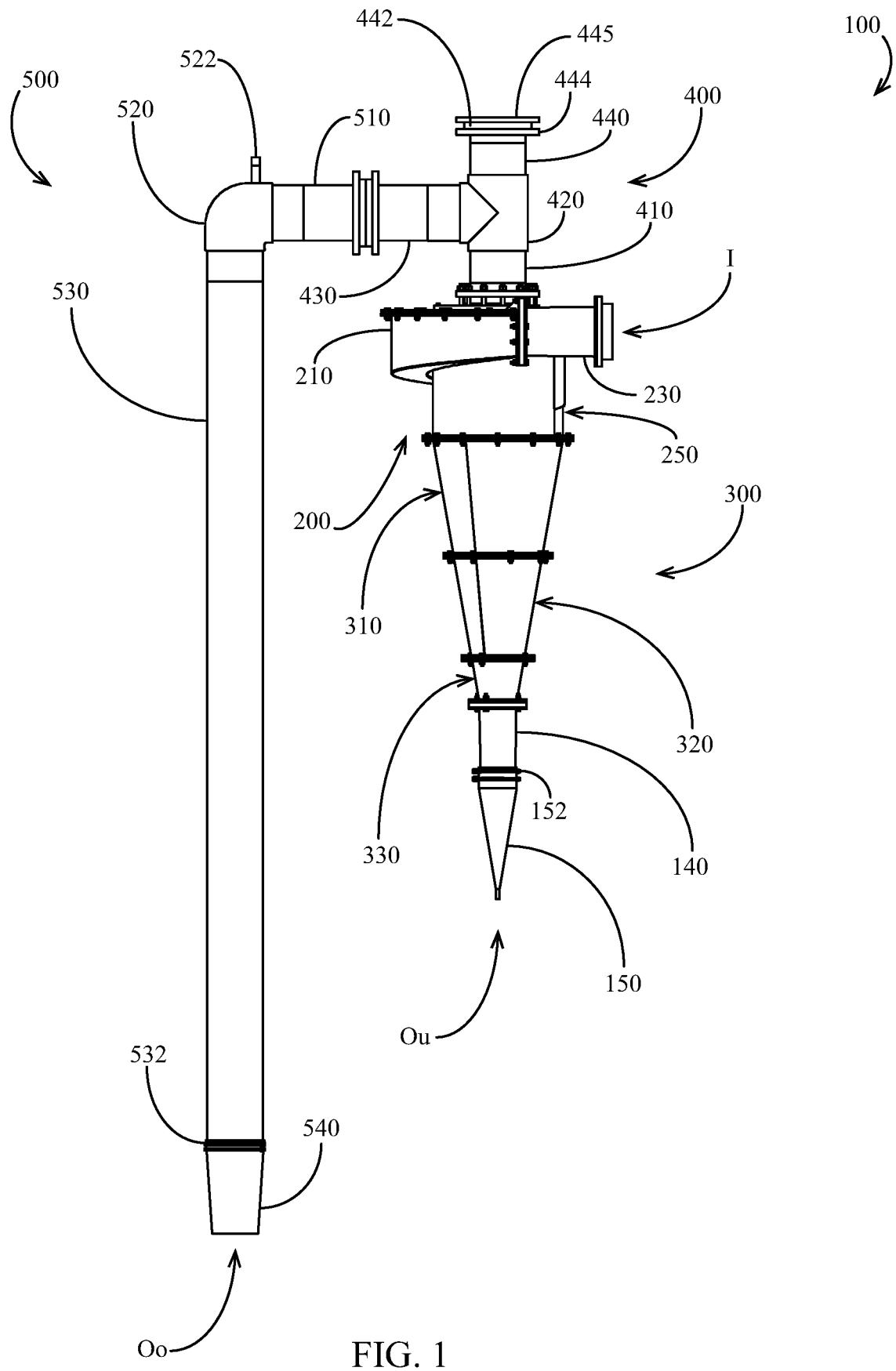
FIG. 1 is a side elevation view of an embodiment of a hydrocyclone.
Figure 2:
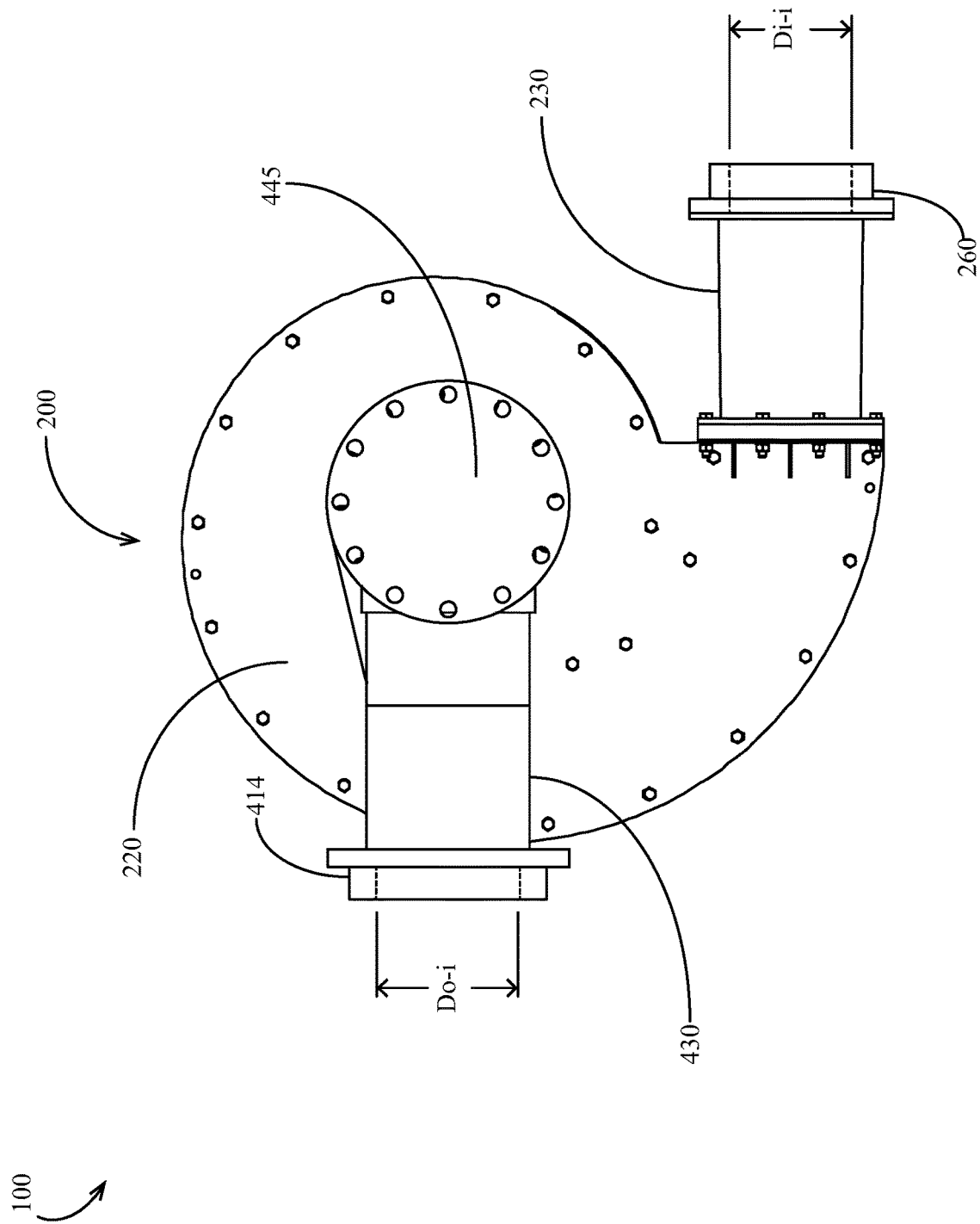
FIG. 2 is a top plan view of the hydrocyclone of FIG. 1.
Figure 3:
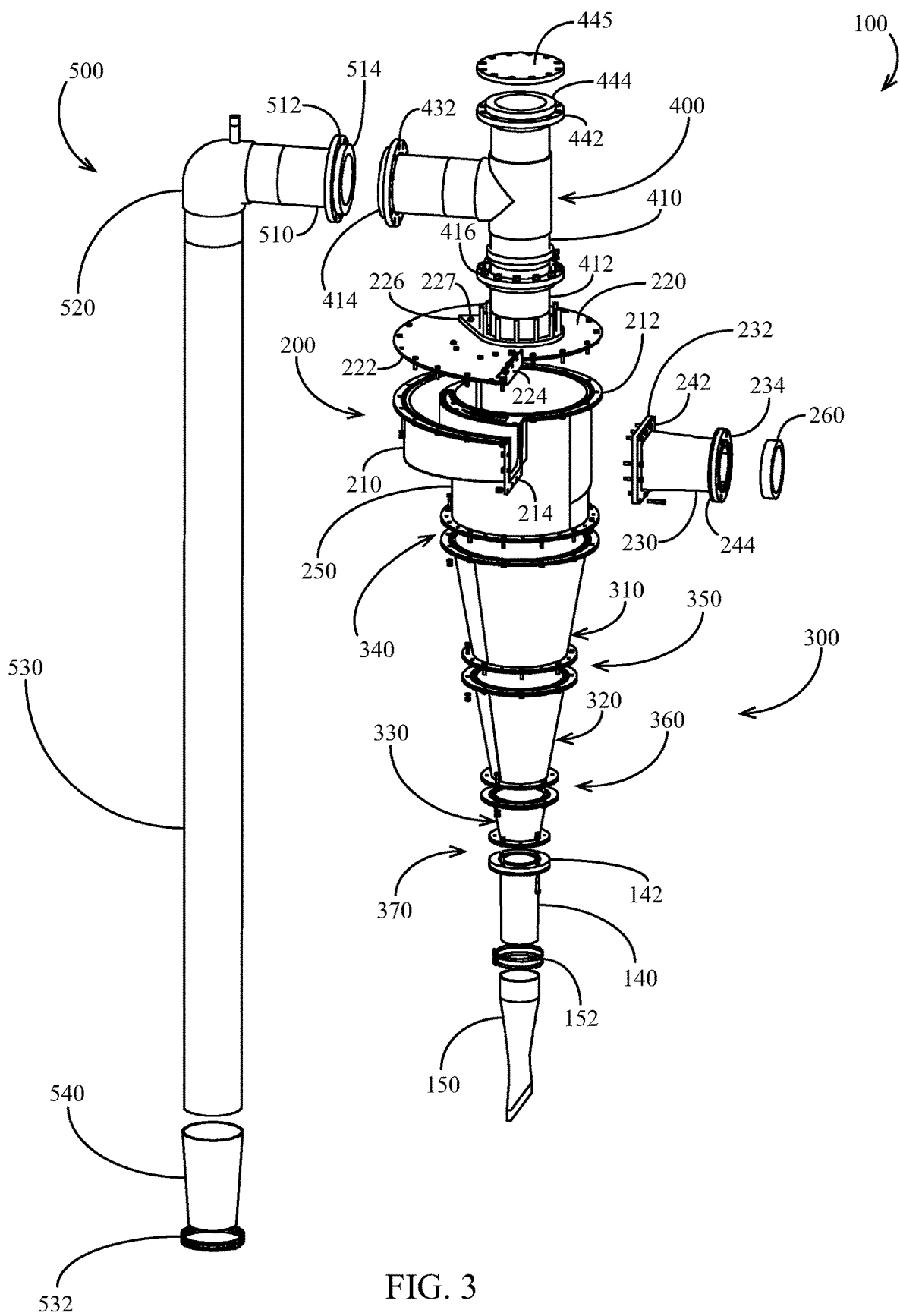
FIG. 3 is an exploded isometric view of the hydrocyclone of FIG. 1.
Figure 7:
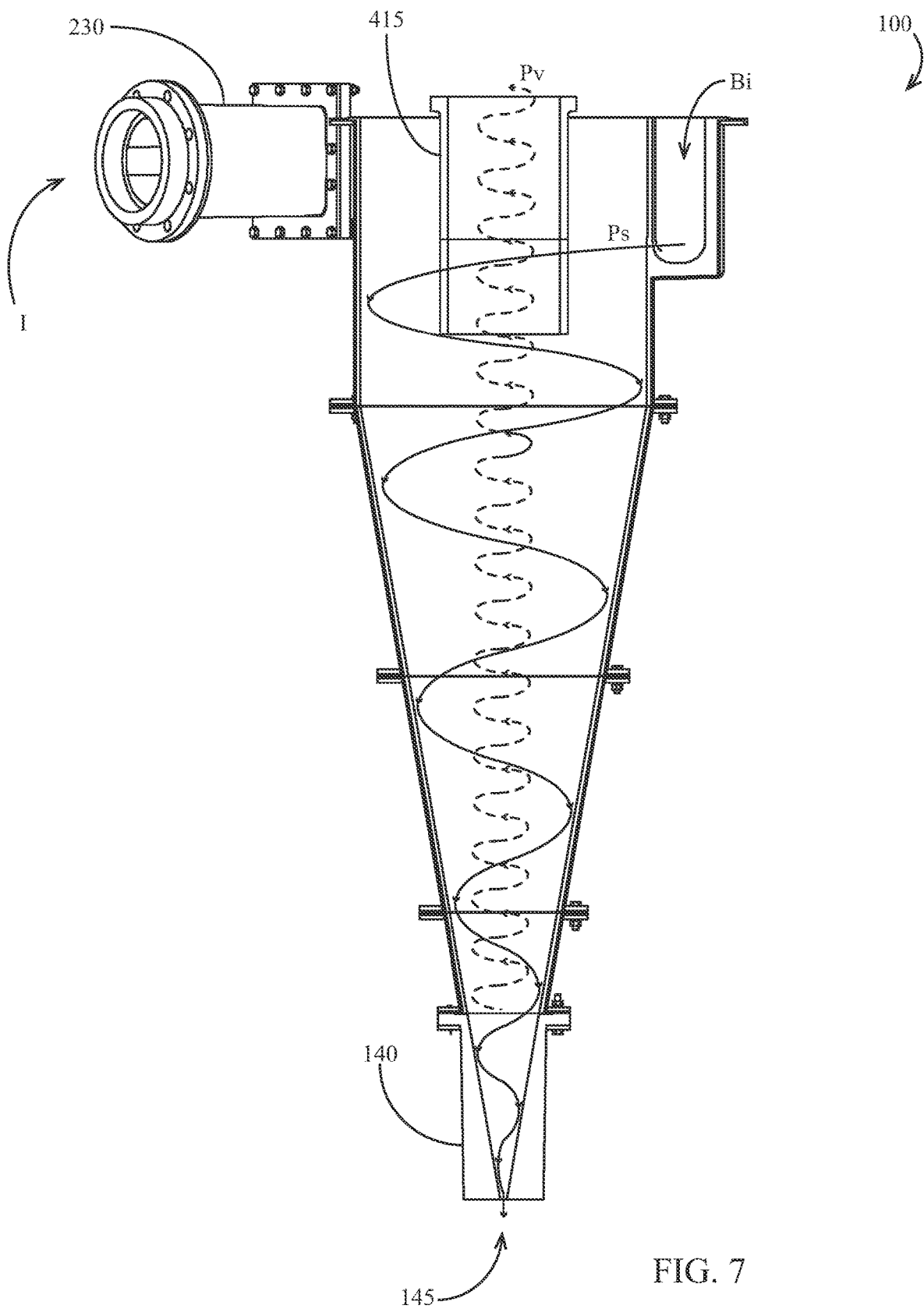
FIG. 7 is a cross-sectional view of the hydrocyclone of FIG. 1 along the section 6-6 of FIG. 5, illustrating exemplary flow paths.

Referring to the drawings, wherein like reference numerals designate identical or corresponding parts throughout the several views, FIGS. 1-3 illustrate a hydrocyclone 100. The hydrocyclone 100 optionally comprises an inlet head 200 having a feed inlet 230 for receiving aggregate material (e.g., solids of varying density suspended in a liquid slurry, etc.) at an inlet opening I. The inlet head 200 optionally imposes a centripetal force on the aggregate material as the aggregate material descends along an optionally generally spiral path (e.g., the exemplary path Ps shown in FIG. 7, etc.) along the circumferential walls of the inlet head into a taper section 300. The taper section 300 optionally comprises a hollow frustum and is optionally mounted (e.g., removably mounted, etc.) to the inlet head 200 at a lower end thereof. The aggregate material optionally descends in an optionally generally spiral pattern around circumferential walls of the taper section 300 into an outlet 140 (e.g., along the exemplary path Ps shown in FIG. 7, etc.). The underflow outlet 140 is optionally mounted (e.g., removably mounted, etc.) to the taper section 300 at a lower end thereof. A first portion of the aggregate material (e.g., relatively coarse solids, etc.) optionally exits an underflow outlet apex 145 disposed at a lower end of the underflow outlet 140. The first portion of aggregate material optionally exits from the underflow outlet apex 145 into at an underflow outlet opening Ou. A second portion of the aggregate material (e.g., relatively fine solids and liquid, etc.) optionally forms a vortex which optionally ascends in a generally volute manner (e.g., along the exemplary path Pv shown in FIG. 7, which optionally has outer radial extents less than that of the exemplary path Ps, etc.) about a central axis Ac of the hydrocyclone 100 into a vortex finder 412 which optionally comprises a hollow tube extending vertically through a lid 220 of the inlet head 200.

The vortex finder 412 optionally leads the second portion of aggregate material into an overflow discharge outlet 400. The discharge outlet 400 optionally directs the second portion of aggregate material to an overflow outlet opening. In some embodiments, the discharge outlet 400 directs the second portion of aggregate material into a siphon 500 having an outlet opening Oo disposed below the apex 145 of the outlet 140.

Some hydrocyclone embodiments described herein may operate according one or more operating principles disclosed in U.S. Pat. No. 4,317,716, incorporated by reference herein in its entirety.

Figure 5:
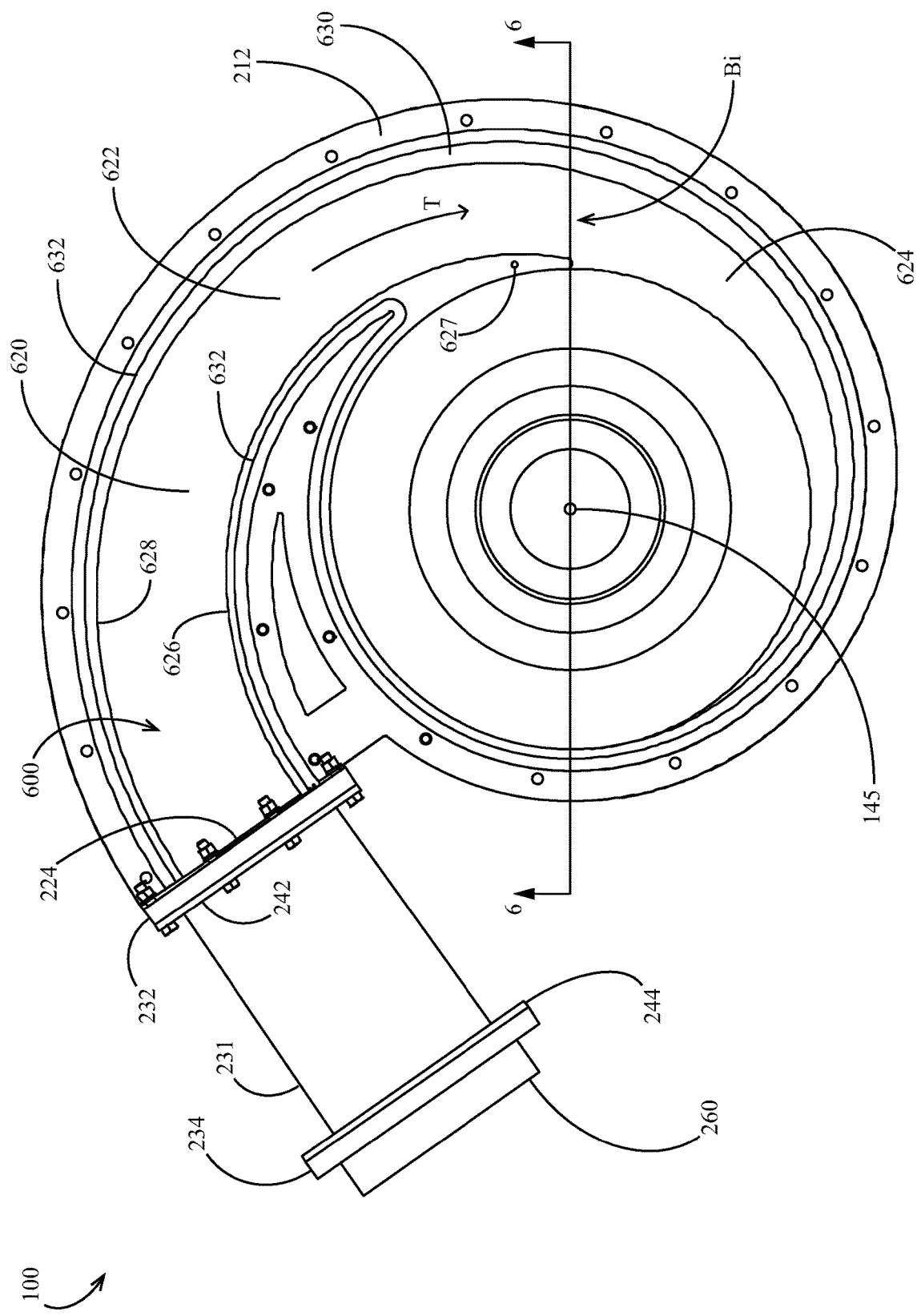
FIG. 5 is a partial plan view of the hydrocyclone of FIG. 1.
Figure 8:
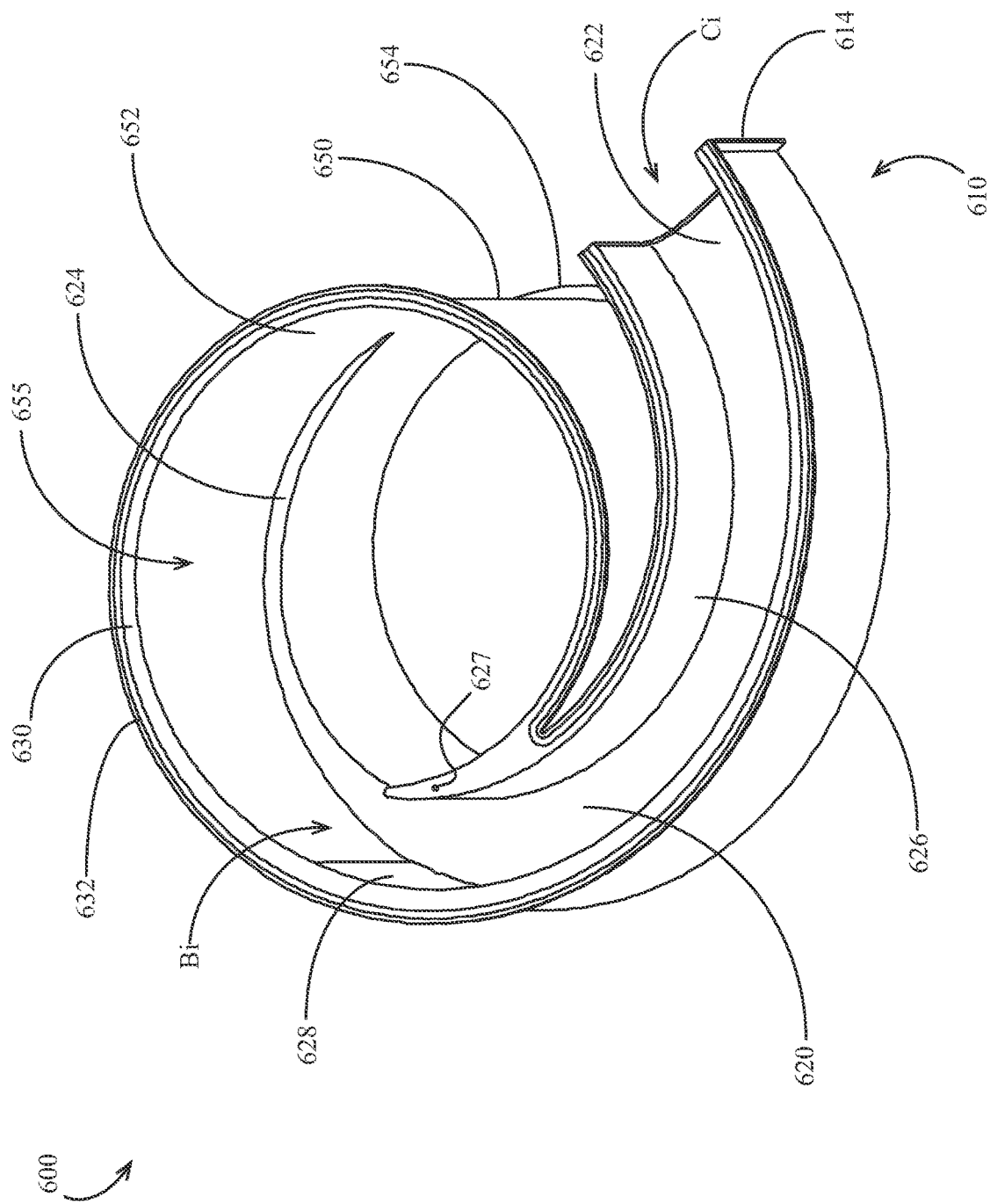
FIG. 8 is an isometric view of an inlet head core of the hydrocyclone of FIG. 1.

Referring to FIGS. 3, 5 and 8, the feed inlet 230 optionally comprises a hollow conduit having an inlet opening I and an outlet opening in fluid communication with a spiral inlet section 210 of the inlet head 200. In the illustrated embodiment, the feed inlet 230 has a circular inlet opening I and an optionally generally rectangular (e.g., generally square, etc.) outlet opening. The feed inlet 230 optionally comprises a circumferential wall 231 which optionally extends between the inlet opening I and the outlet opening. In some embodiments, an inner surface of the circumferential wall 231 may transition (e.g., gradually, continuously, discontinuously, etc.) from a circular cross-section to a generally rectangular (e.g., generally square, etc.) cross-section along the length of the feed inlet 230. The feed inlet 230 optionally includes (e.g., is formed as a part with, etc.) an inlet mounting flange 234 having a plurality of mounting openings 235. The inlet mounting flange 234 may have a generally circular shape as illustrated. The feed inlet 230 optionally includes (e.g., is formed as a part with, etc.) an outlet mounting flange 232 having a plurality of mounting openings 233. The outlet mounting flange 232 may have a generally rectangular (e.g., generally square, etc.) shape as illustrated. The feed inlet 230 is optionally made of a polymer (e.g., urethane or another polymer which may comprise a plastic or rubber, etc.) and may be formed by a casting process (e.g., resin casting, etc.).

The feed inlet 230 is optionally mounted to the inlet section 210 by bolts extending through mounting openings in a flange plate 242 (e.g., a steel flange, etc.), the mounting flange 232, and flange plates 214, 224 on the inlet section. Upon installation, tightening of the bolts optionally compresses the mounting flange 232 between the flange plate 242 and the flange plates 214, 224, thus securing the feed inlet 230 in position relative to the inlet section 210. Referring to FIG. 8, an inlet head core 600 (described in more detail herein) is optionally made of a polymer (e.g., urethane or another polymer which may comprise a plastic or rubber, etc.) and may be formed by a casting process (e.g., resin casting, etc.). The inlet head core 600 optionally includes an inlet flange 614 which is optionally flush with the flange plates 214, 224 such that compression of the mounting flange 232 against the flange plates 214, 224 optionally compresses a mating surface of the mounting flange 232 against a corresponding mating surface of the inlet flange 614. A lid 220 of the inlet head 200 optionally includes a lid seal 222 (not shown in FIG. 8). The lid seal 222 is optionally disposed between the lid 220 (e.g., a metal lid, etc.) of the inlet head and the feed inlet in order to form an upper sealing surface of the inlet head core 600. The lid seal 222 is optionally made of a polymer (e.g., urethane or another polymer which may comprise a plastic or rubber, etc.). A mating surface of the lid seal 222 is optionally flush with the flange plate 224 and optionally forms a sealed contact area with the mounting flange 232 of the inlet head at an upper end thereof.

Figure 12:
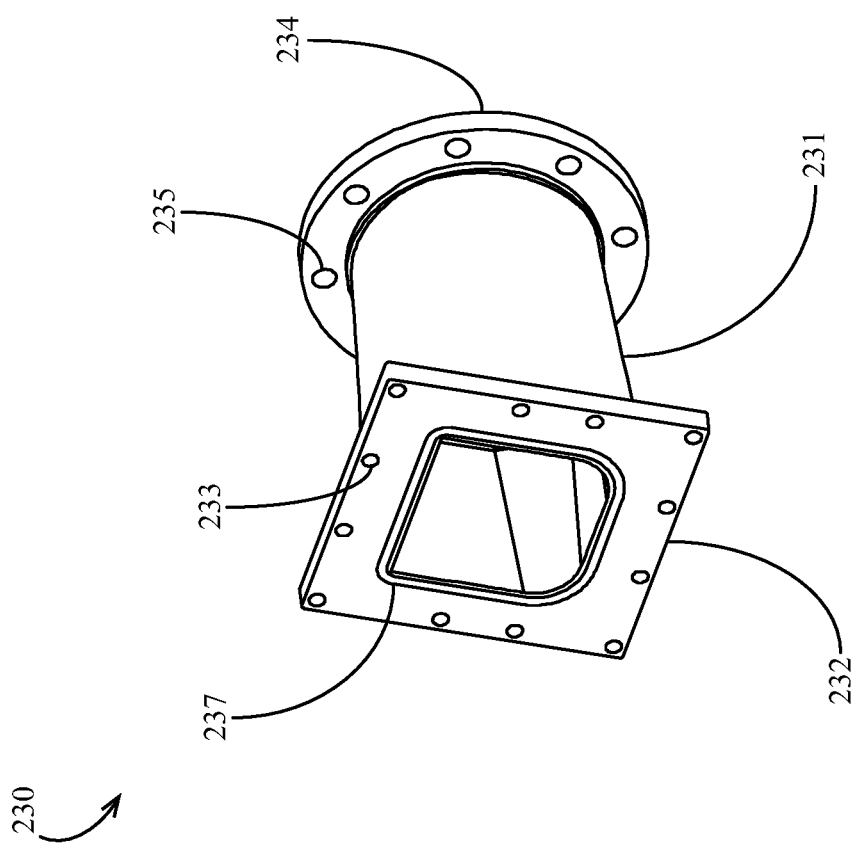
FIG. 12 is another isometric view of an inlet of the hydrocyclone of FIG. 1.

Thus, when the feed inlet 230 is mounted to the inlet section 210, the lid seal 222 and the inlet flange 614 optionally form a circumferential compression seal with the outlet opening of the feed inlet 230. Referring to FIG. 12, one or more seals 237 optionally extend circumferentially around the outlet openings of the feed inlet 230. The seals 237 are optionally formed as a part with the mounting flange 232 (in other embodiments, the seals 237 may be additionally or alternatively formed as a part with the flange 614 or may comprise separate and/or separable sealing elements disposed between flanges 614, 232, etc.). Each seal 237 may be generally semi-circular in cross-section (e.g., when not compressed, etc.). A lower portion of each seal 237 may have a curved surface corresponding to a lower portion of the flange 614 and optionally contacts the flange 614 when installed to form a sealed contact surface with the flange 614. An upper portion of each seal 237 optionally contacts the lid seal 222 when installed in order to form a sealed contact surface with the lid seal 222.

Figure 11:
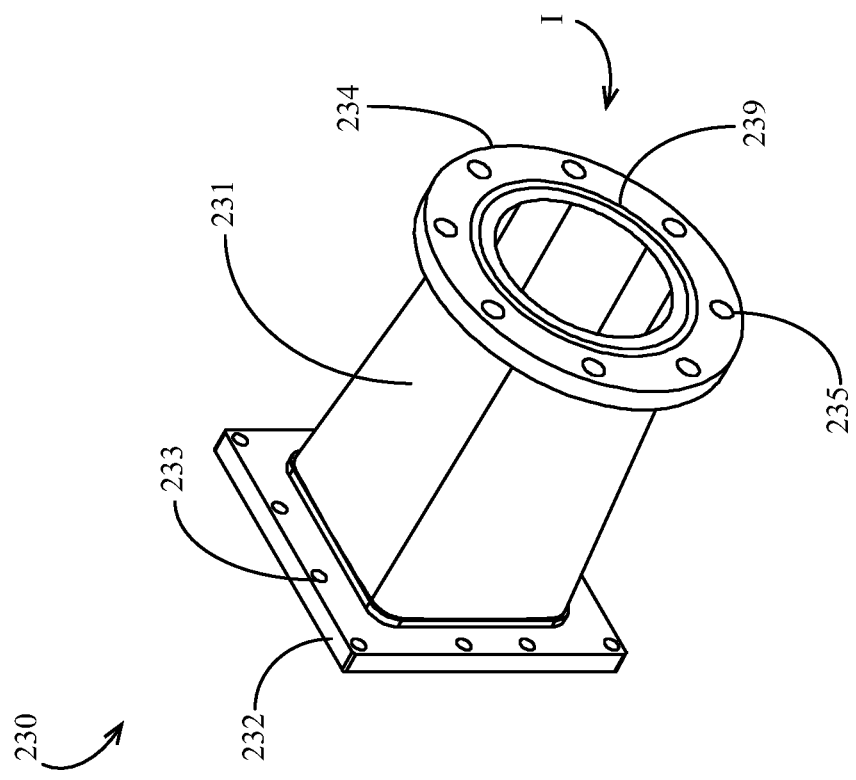
FIG. 11 is an isometric view of an inlet of the hydrocyclone of FIG. 1.

Referring to FIG. 11, one or more seals 239 generally similar to the seal or seals 237 are optionally disposed generally circumferentially about the inlet opening I of the feed inlet 230 and are optionally formed as a part with the flange 234. The inlet I is optionally mounted to an inlet pipe (not shown) by bolting a mounting flange 234 between a flange plate 244 and a corresponding flange (not shown) of the inlet pipe using mounting openings 235 and corresponding openings in the flange plate 244 and the flange of the inlet pipe. An optional annular spacer 260 is optionally disposed between the flange 234 and the inlet pipe. When installed, the spacer 260 may include a pressure tap (not shown) in fluid communication with a pressure and/or flow measurement device such as a pressure gauge. The inlet pipe and the annular spacer 260 optionally comprise a polymer such as high-density polyethylene (HDPE), which may comprise a different material from that comprising the feed inlet 230 (e.g., urethane, etc.) and/or the inlet head core 600 (e.g., urethane, etc.). Referring to FIG. 2, the inlet I and/or the spacer 260 optionally have an inner diameter Di-i. A diameter of each seal 239 is optionally greater than Di-i and each seal 239 is optionally generally concentric with the inlet opening I such that each seal forms a continuous contact surface with the spacer 260.

The inner diameter Di-i is optionally selected to equal (or approximately equal) corresponding standard inner diameters of pipes having the material of the inlet pipe (e.g., HDPE pipe, etc.). In exemplary embodiments such as those in which the inlet pipe and/or spacer 260 are made of HDPE, the inner diameter Di-i may be equal to (or approximately equal to) any of the following: 4.7 inches, 4.87 inches, 5.8 inches, 6.24 inches, 7.5 inches, 7.55 inches, 9.4 inches, 11.16 inches, 12.25 inches, 14 inches.

Referring to FIGS. 3, 5 and 8, the inlet head 200 optionally comprises an inlet head core 600 and lid seal 222 (which may both comprise urethane or another polymer as described herein) disposed within a shell (e.g., a metal structure such as steel, etc.) comprising a spiral inlet section 210 and a generally cylindrical body 250. A flange 212 optionally extends circumferentially about the upper surface of the inlet section 210 and body 250. The flange 212 optionally includes mounting openings corresponding to mounting openings in the lid 220 such that the lid 220 may be fastened to the upper surface of the inlet section 210 and body 250. The lid seal 222 is optionally of the same shape as the lid 220 and optionally has mounting openings corresponding to those of the flange 212 and lid 220. The lid seal 222 (which may comprise urethane or another polymer as described herein) is optionally mounted between the lid 220 and the upper surface of the inlet section 210 and body 250. When installed, the lid seal 222 is optionally flush with the upper surface 630 of the inlet head core 600 and optionally forms a contact seal with the inlet head core 600, which contact seal optionally protects the lid 220 (and other metal components of the inlet head 200) from contacting liquid and/or aggregate material travelling through the inlet head core 600.

One or more seals 632 optionally extends along the upper surface 630. When the lid seal 222 and lid 220 are installed, the seal or seals 632 are optionally compressed between the upper surface 630 and the lid seal 222. Each seal 632 is optionally formed as a part with the inlet head core 600 and/or the surface 630, or alternatively may be formed as a part with the lid seal 222 or may comprise a separate sealing element. Each seal 632 is optionally generally semi-circular in cross-section (e.g., when not compressed). Each seal 632 optionally extends at least partially in a spiral manner. Each seal optionally extends on both sides of a portion (e.g., inlet portion, spiral portion, etc.) of the path Ps (see FIG. 7).

Referring to FIG. 8, the inlet head core 600 optionally comprises a spiral inlet section 610 having a core inlet Ci at least partially bounded by the flange 614. The inlet section 610 optionally defines a channel having an outer sidewall 628, an inner sidewall 626, and a lower surface 622. The sidewalls 626, 628 optionally meet the lower surface 622 at rounded fillets, although in alternative embodiments a non-filleted corner may exist between each sidewall and the lower surface. The lower surface 622 optionally extends generally spirally inward toward the central axis Ac. The lower surface 622 optionally descends gradually (e.g., relative to the lid 220) along the direction of travel T of the aggregate material received from the feed inlet 230.

Figure 20:
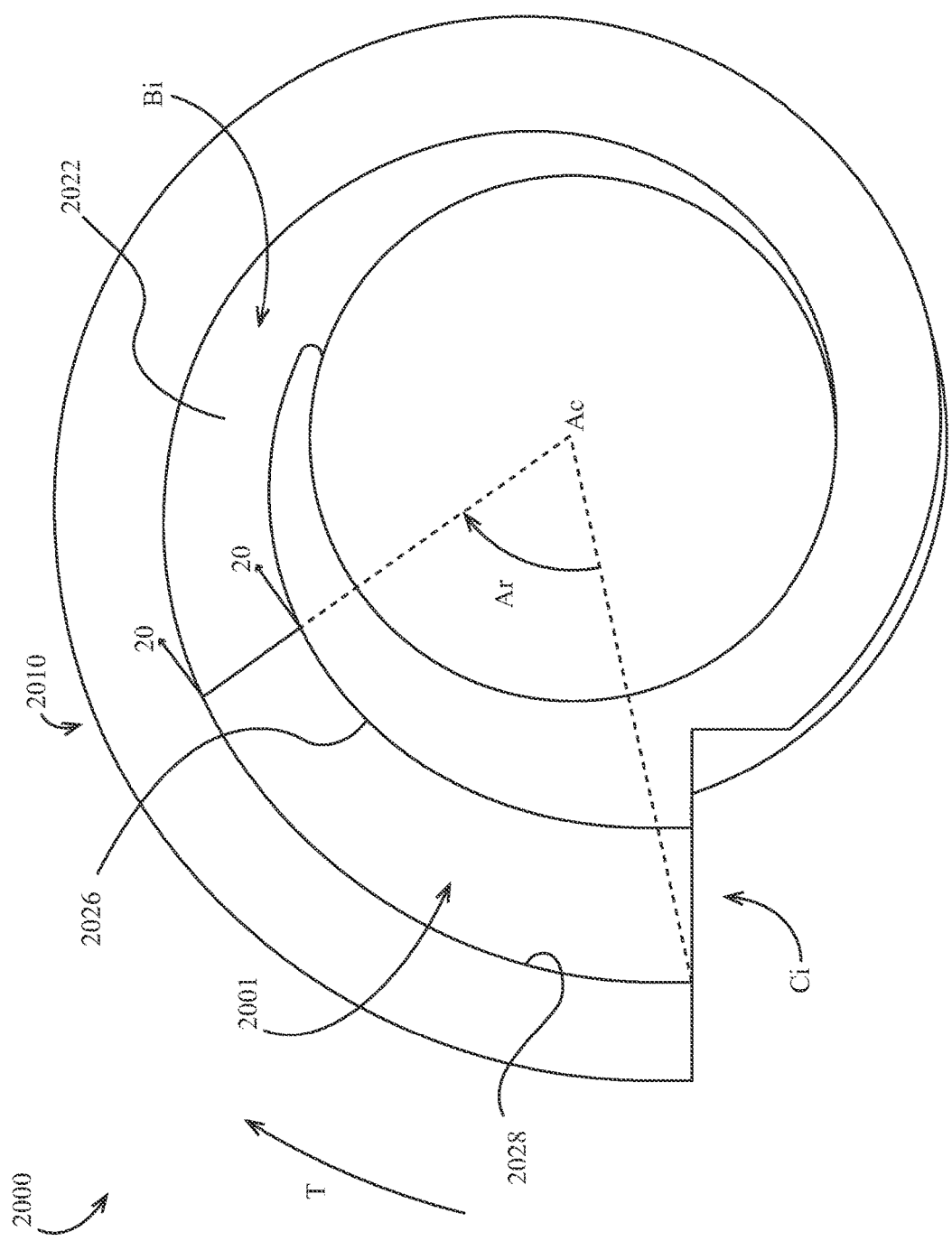
FIG. 20 is a plan view of an embodiment of a hydrocyclone inlet head.

Referring to the embodiment of an inlet head core 2000 illustrated in FIG. 20, the inlet head core 2000 optionally comprises a spiral inlet section 2010 having a core inlet Ci. The inlet section 2010 optionally defines a channel 2001 having an outer sidewall 2028, an inner sidewall 2026, and a lower surface 2022. The inner sidewall 2026 optionally terminates at or adjacent to a body inlet Bi. The lower surface 2022 optionally extends generally spirally inward toward the central axis Ac. The lower surface 2022 optionally descends gradually (e.g., relative to a lid and/or upper surface of the channel 2001) along the direction of travel T of the aggregate material (e.g., feed slurry, sand slurry, etc.).

Figure 21:
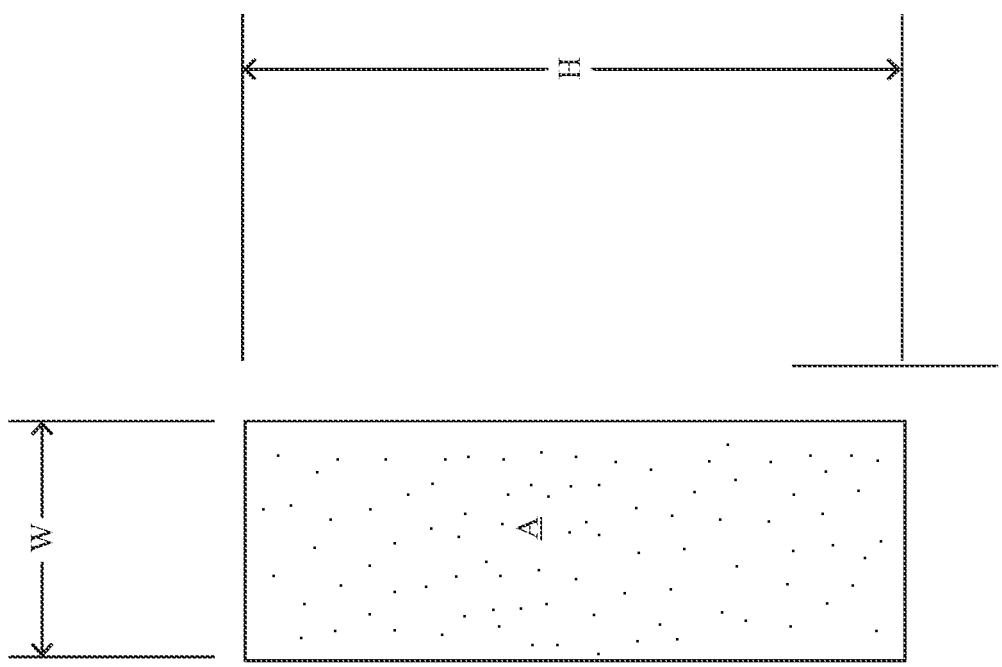
FIG. 21 illustrates a schematic representation of the radial cross-section 20-20 of FIG. 20.

Continuing to refer to FIG. 20, an angle Ar is optionally measured about the central axis Ac between the channel inlet Ci (e.g., the outer sidewall 2028 at the channel inlet) and a radial cross-section of the channel 2001 such as section 20-20 schematically illustrated in FIG. 21. In some embodiments, each radial cross-section (such as that illustrated in FIG. 21) has a height H, a width W, and an area A. The values of H, W, and A each optionally vary with the angle Ar as described in more detail below according to various embodiments. It is worth noting that connection of the lower surface 2022 with the inner sidewall 2026 and the outer sidewall 2028 of section 20-20 of FIG. 21 is schematically illustrated with square corners. Those skilled in the art will appreciate that connection of the lower surface 2022 with the inner side wall 2026 and the outer sidewall 2028 can include rounded corners having a selected radius and the extent of the selected radius can be taken into account when calculating the value of A.

In some embodiments, the height H increases (e.g., linearly, approximately linearly, etc.) with increasing values of the angle Ar. In various embodiments, the height H varies linearly or approximately linearly with the angle Ar with a slope of between 0.02 and 0.05, between 0.03 and 0.04, between 0.035 and 0.04, between 0.03 and 0.035, 0.03, approximately 0.03, 0.031, approximately 0.031, 0.032, approximately 0.032, 0.033, approximately 0.033, 0.034, approximately 0.034, 0.035, approximately 0.035, 0.036, approximately 0.036, 0.037, approximately 0.037, 0.038, approximately 0.038, 0.039, approximately 0.039, 0.04, approximately 0.04, etc. In some embodiments, the variation between maximum and minimum values of the height H is greater than 30%, greater than 40%, greater than 50%, greater than 55%, about 55%, about 60%, between 50% and 60%, between 55% and 65%, etc.

In some embodiments, the width W decreases (e.g., linearly, approximately linearly, etc.) with increasing values of the angle Ar. In various embodiments, the width W varies linearly or approximately linearly with the angle Ar with a slope of between −0.01 and −0.03, −0.01, approximately −0.01, −0.02, approximately −0.02, −0.03, approximately −0.03, between −0.01 and −0.02, between −0.02 and −0.03. In some embodiments, the variation between maximum and minimum values of the width W is greater than 30%, greater than 40%, greater than 50%, greater than 55%, about 55%, about 60%, between 50% and 60%, between 55% and 65%, etc.

In some embodiments, the area A initially increases with increasing values of the angle Ar (e.g., from 0 to a threshold angle, etc.) and then decreases with increasing values of the angle Ar (e.g., from the threshold angle to an angle corresponding to the terminal end of the channel 2001, etc.). In some embodiments, the threshold angle is between 70 and 80 degrees, about 70 degrees, about 75 degrees, about 80 degrees, between 73 and 77 degrees, etc. In some embodiments, the area A varies parabolically with the angle Ar. In some embodiments, the variation between maximum and minimum values of area A is less than 25%, less than 20%, less than 15%, about 10%, less than 10%, less than 5%, between 5% and 15%, between 7% and 13%, between 9% and 13%, etc.

In some embodiments, the variation in the area A is less than 20%, the variation in the height H is greater than 50% and the variation in the width W is greater than 50%.

In some embodiments, the variation in the area A is less than 15%, the variation in the height H is greater than 50% and the variation in the width W is greater than 50%.

In some embodiments, the variation in the area A is less than 25%, the variation in the height H is greater than 33% and the variation in the width W is greater than 33%.

Returning to FIGS. 3, 5, and 8, in some embodiments a stabilizing element 227 (e.g., a bolt or metal tab, etc.) extends through lid 220 into an opening 627 in the inlet head core 600 (e.g., adjacent to a portion of sidewall 626 distal from the feed inlet 230, etc.). The stabilizing element 227 may extend through the lower ring 226 (e.g., a radially eccentric portion thereof, etc.).

Figure 6:
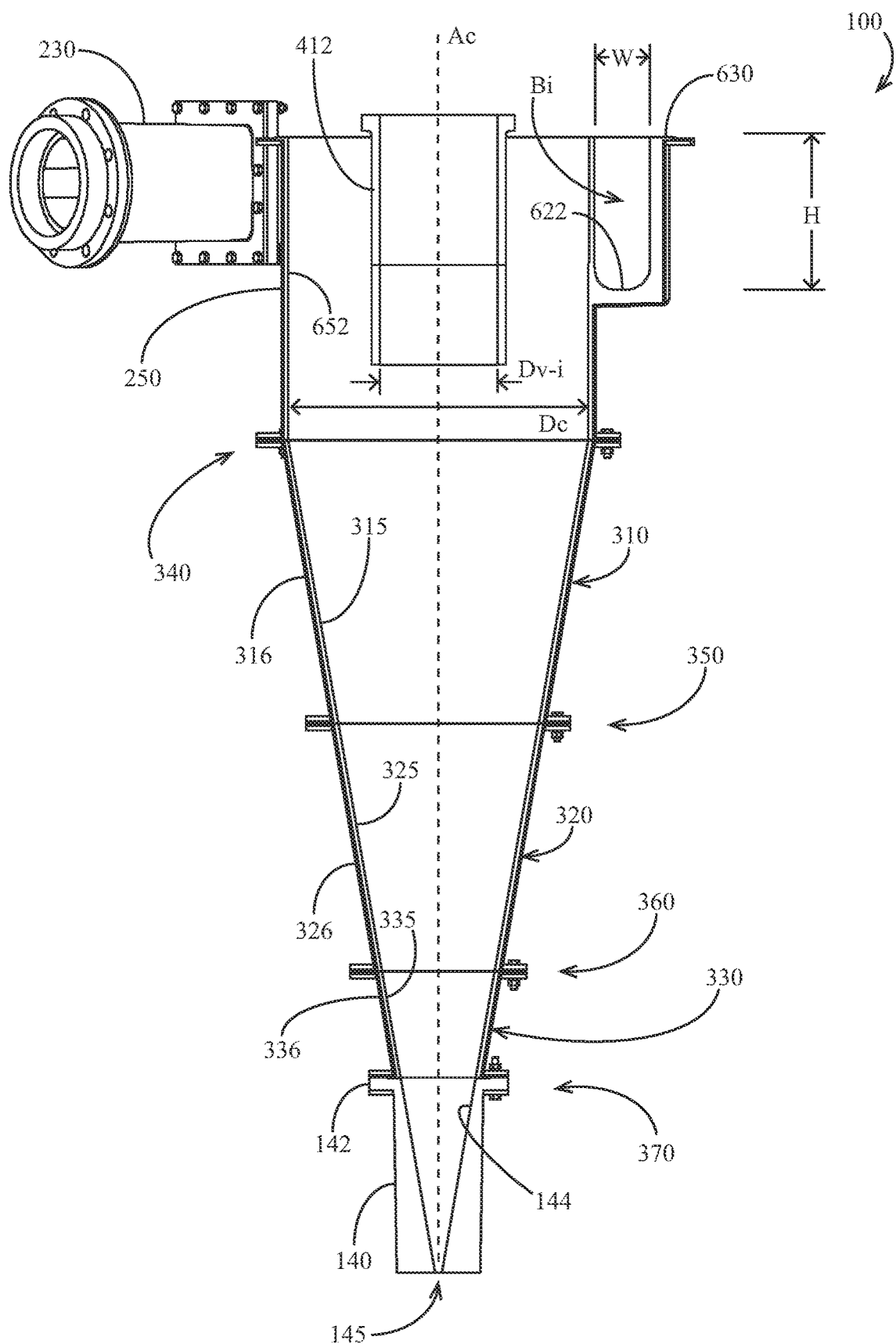
FIG. 6 is a cross-sectional view of the hydrocyclone of FIG. 1 along the section 6-6 of FIG. 5.

The inner sidewall 626 optionally terminates at a body inlet Bi. The body inlet Bi optionally defines a material inlet through which inlet material flows from the inlet section 610 into a body 650 of the inlet head core 600. The body inlet Bi is optionally bounded an outer end by the outer sidewall 628, at an inner end by the inner sidewall 626, at a lower end by the lower surface 622, and at an upper end by the lid seal 222. Turning to FIG. 6, a height H of the body inlet Bi may be measured by a distance (e.g., a maximum distance, etc.) between the lower surface 622 and the upper surface 630 (and/or the lid seal 222). A width W of the body inlet Bi may be measured by a distance (e.g., a maximum distance, etc.) between the sidewalls 626, 628. A ratio H/W between the height and width of the inlet Bi may be 3, approximately 3, between 2.5 and 3.5, between 2.6 and 3.4, between 2.6 and 2.7, between 2.65 and 2.7, 2.67, approximately 2.67, approximately 2.6, approximately 2.7, between 2.7 and 3.3, between 2.8 and 3.2, between 2.9 and 3.1, between 2.95 and 3.05, slightly less than 3, slightly greater than 3, between 2.8 and 3, between 2.9 and 3, between 2.95 and 3, between 3 and 3.05, between 3 and 3.1, between 3 and 3.2, etc.). In an exemplary embodiment, the inlet head diameter Dc (e.g., the inner diameter of the inlet head sidewall 652, etc.) is 24 inches (or approximately 24 inches, etc.), the height H is approximately 12 inches (e.g., between 11.75 and 12 inches, 11.78 inches, approximately 11.78 inches, 11.79, approximately 11.79, etc.) and the width W is approximately 4.5 inches (e.g., 4.4 inches, approximately 4.4 inches, between 4.3 and 4.5 inches, between 4.3 and 4.4 inches, between 4.4 and 4.5 inches, etc.).

Returning to FIG. 8, the lower surface 622 optionally comprises a portion of a surface 620 which optionally also includes a surface 624 which optionally extends in a generally spiral and descending manner into the interior volume 655 of the body 650 along the sidewall 652. The width of the surface 624 optionally decreases along the direction of inlet material travel.

In the illustrated embodiment, material entering the inlet Ci has a general velocity vector that does not intersect (e.g., extends generally tangential to) the body 650. However, in other embodiments the inlet section 610 may be reconfigured such that the material entering the inlet Ci has a general velocity that does intersect (e.g., extends toward) the body 650.

Figure 4:
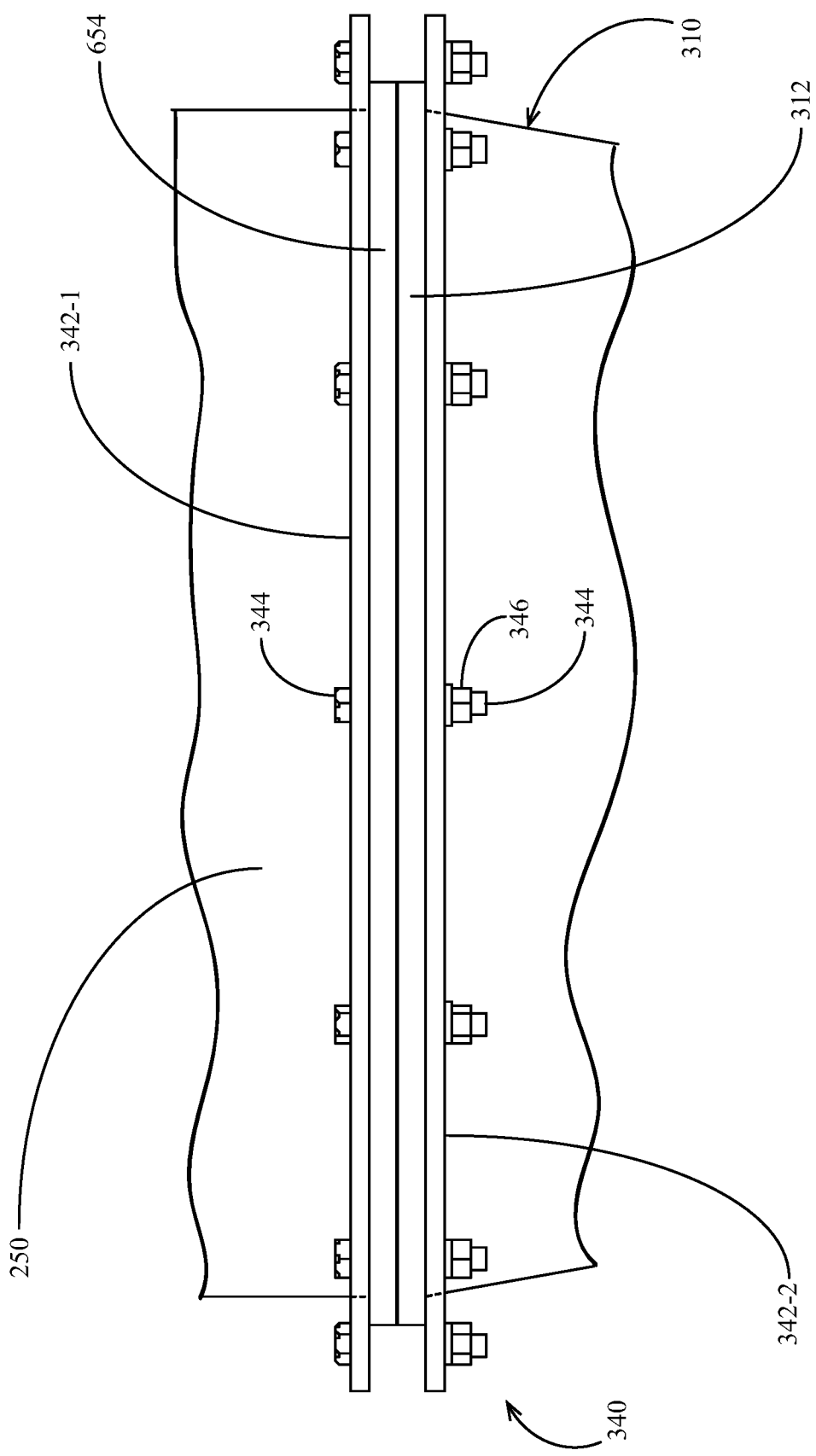
FIG. 4 is a partial expanded side elevation view of the hydrocyclone of FIG. 1.

Referring to FIGS. 3, 4, and 6, the taper section 300 is optionally mounted to the head by a mounting arrangement 340. The mounting arrangement 340 is shown in more detail in FIG. 4, in which portions of connecting bolts 344 are not shown for clarity. The mounting arrangement 340 generally comprises a pair of optionally annular mounting plates 342-1, 342-2 (e.g., made of metal such as steel, etc.). The mounting plates 342 are optionally fixed relative to one another by radially arranged bolts 344 extending through corresponding mounting holes in each plate and nuts 346, although other devices may be used to fix the relative position of the mounting plates. A mounting flange 654 is optionally formed as a part with (or otherwise joined to) a lower portion of the inlet head core 600. The mounting flange 654 optionally extends radially outwardly of the body 250 of the inlet head 200. A lower surface of mounting flange 654 optionally mates with an upper surface of a mounting flange 312 of the taper section 300 to form an optionally annular contact surface. Tightening of bolts 344 (or otherwise moving the mounting plates 342 closer together) optionally compresses the mounting flanges 654, 312 together such that the annular contact surface is effectively sealed to prevent aggregate material from escaping. The bolts 344 optionally extend downward along axes disposed radially outwardly of the flanges 654, 312; in other embodiments, the flanges 654, 312 may be provided with mounting holes through which the bolts 344 extend. One or more optionally annular shims 349 (see FIG. 13) may be disposed between the mounting plates 342. The shim or shims 349 optionally include mounting holes 348-1 (e.g., a radial array of mounting holes) for partially receiving bolts 344. The mounting plates 342 optionally include mounting holes 348-2 (e.g., a radial array of mounting holes) each aligned with corresponding mounting holes in the opposing mounting plate and/or with mounting holes 348-1 in the shims 349.

Referring to FIGS. 3 and 6, the taper section optionally comprises a plurality of taper subsections. Each taper subsection optionally comprises a hollow frustum. In the illustrated embodiment, a first taper subsection 310 is mounted at an upper end thereof to a lower end of the inlet head 200 by mounting arrangement 340 as described herein. A second taper subsection 320 is optionally mounted at an upper end thereof to a lower end of the first taper subsection 310 by a mounting arrangement 350 optionally generally similar to the mounting arrangement 340. A third taper subsection 330 is optionally mounted at an upper end thereof to a lower end of the second taper subsection 310 by a mounting arrangement 360 optionally generally similar to the mounting arrangement 340. The inner radius of the mating surfaces between the taper subsections is optionally substantially equal such that downward flow along the inner sidewalls of the taper subjections (e.g., a portion of the path Ps) is not disturbed by discontinuities along the inner surface of the taper section 300. The taper subsections 310, 320, 330 optionally comprise cores 315, 325, 335 respectively; the cores may be made of a polymer such as urethane. The cores 315, 325, 335 are optionally encased by shells 316, 326, 336 respectively; the shells may be made of a metal such as steel.

Figure 9:
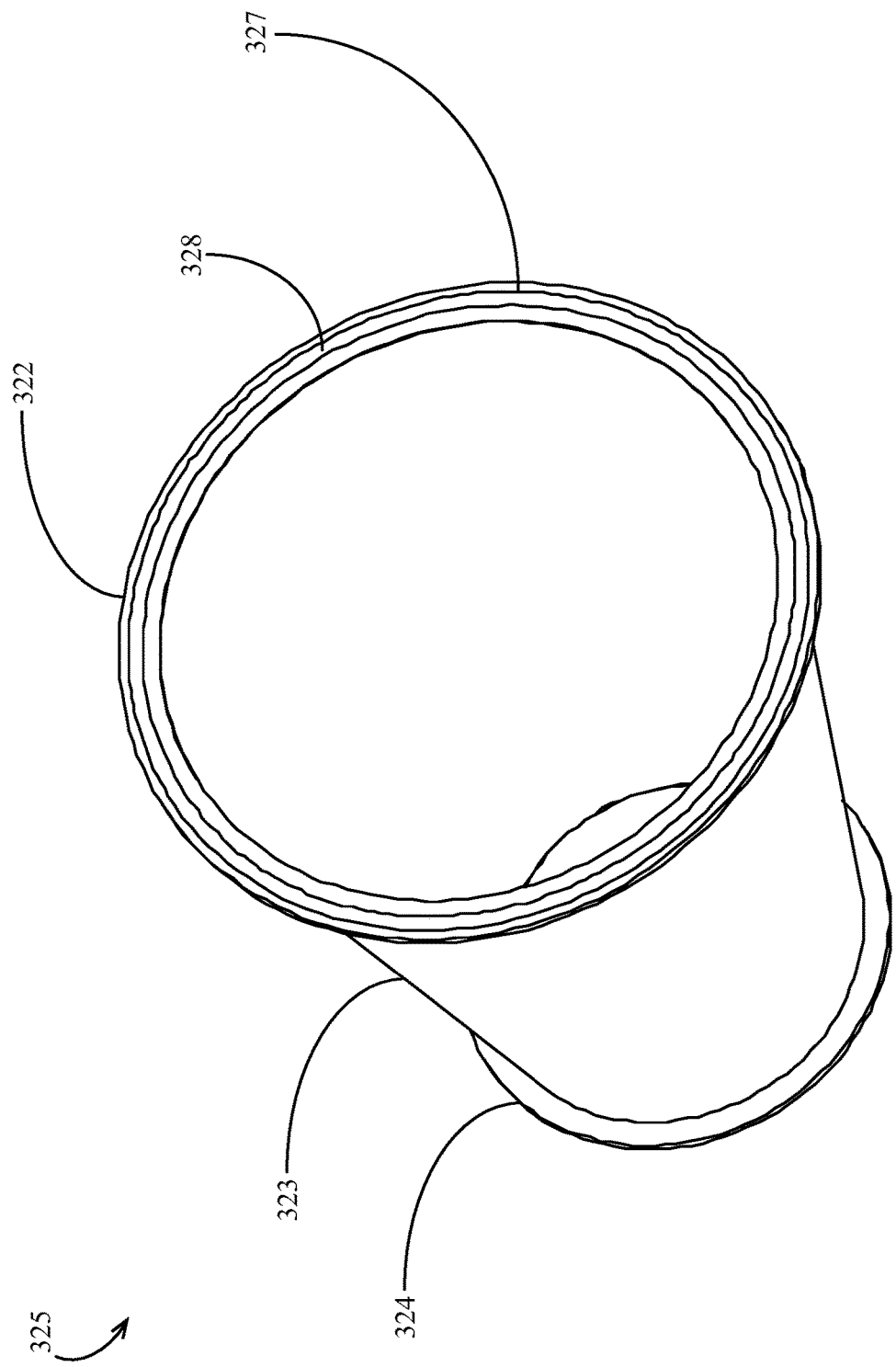
FIG. 9 is an isometric view of a taper section of the hydrocyclone of FIG. 1.

Turning to FIG. 9, the core 325 is illustrated in more detail; the details described herein may be representative of the cores of each taper subsection. The core 325 optionally comprises a tapered sidewall 323 (e.g., a frustrum-shaped sidewall, etc.) extending between upper and lower mounting flanges 322, 324 respectively. The mounting flanges 322, 324 optionally extend radially outwardly from the sidewall 323 and optionally extend radially outwardly of the shell 326. The upper flange 322 optionally has an upper surface 328 corresponding to and forming an optionally annular contact surface with a flange disposed above the taper subsection 320.

One or more seals 327 are optionally disposed on the upper surface 328. The seals 327 are optionally formed as a part with the mounting flange 322 (in other embodiments, the seals 327 may be additionally or alternatively formed as a part with a lower surface of lower flange 324 or may comprise separate and/or separable sealing elements disposed between flanges, etc.). The seals 327 optionally each have a thickness (e.g., measured from the mating surface of the mounting flange 322) less than the thickness of the mounting flange 322 (e.g., less than a fifth of the mounting flange thickness or less than a tenth of the mounting flange thickness, etc.). Each seal 322 may be generally semi-circular in cross-section (e.g., when not compressed). In embodiments including multiple seals 327, the seals are optionally disposed in generally concentric fashion. Each seal 327 optionally contacts the adjacent mounting flange in order to form a sealed contact surface with the adjacent mounting flange.

Figure 14:
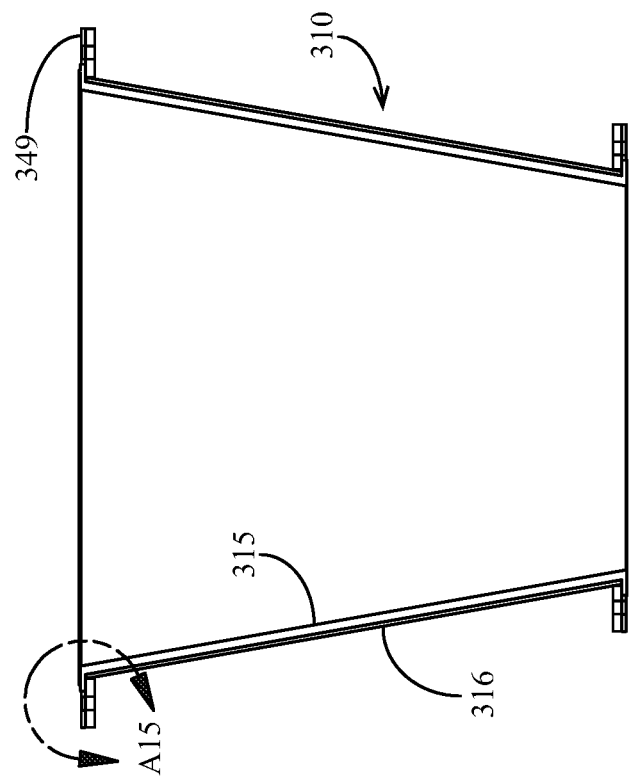
FIG. 14 is a side elevation view of the taper subsection of FIG. 13 along the section 6-6 of FIG. 5.
Figure 13:
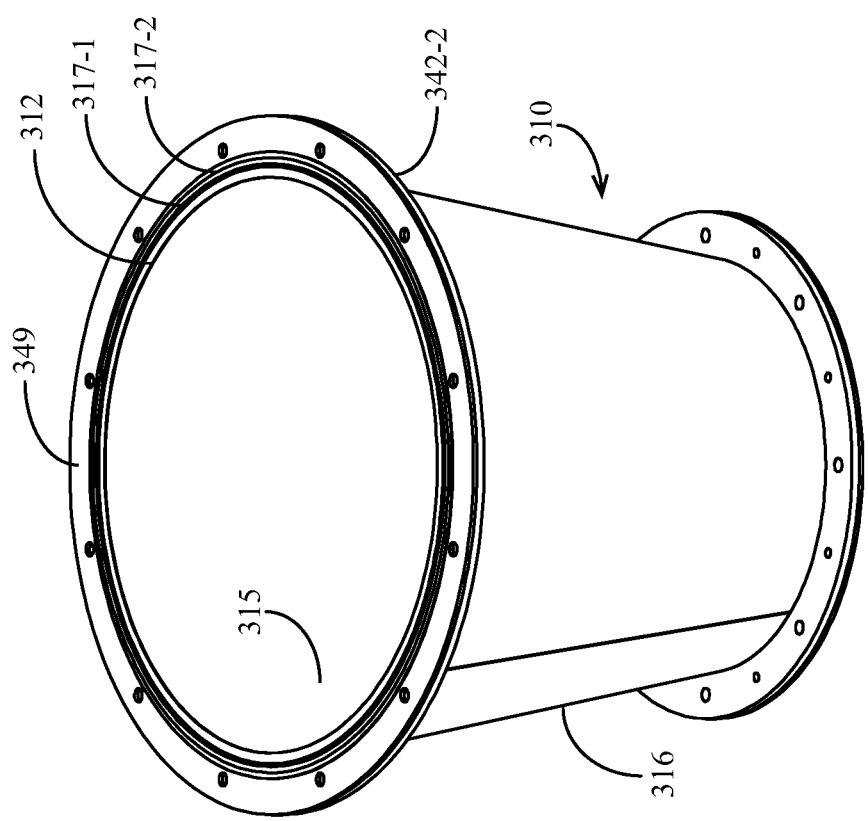
FIG. 13 is an isometric view of a taper subsection of the hydrocyclone of FIG. 1.
Figure 15:
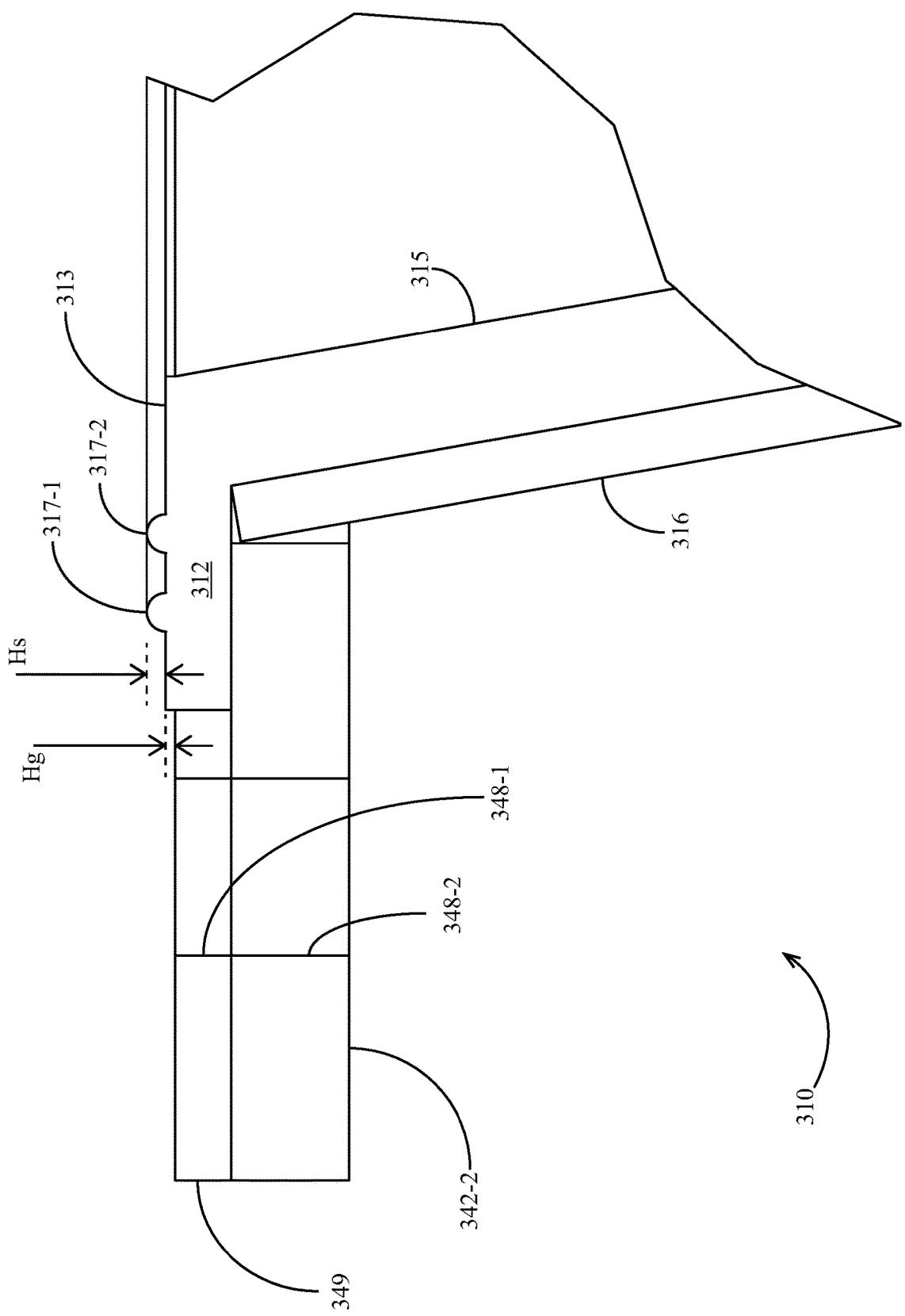
FIG. 15 is an expanded view of the detail area A15 of FIG. 14.

Turning to FIGS. 13 through 15, a plurality of seals 317-1, 317-2 are illustrated disposed in a generally concentric fashion on the taper subsection 310. The seals 317 are optionally disposed on (e.g., formed as a part with, etc.) a mounting flange 312 of the core 315, e.g., on an upper surface 313 thereof. The seals 317 optionally have an uncompressed height Hs relative to surface 313 which is optionally selected to create a sealing effect when the taper subsection 310 is mounted to the inlet head 200. It should be appreciated that the seals 317 are illustrated in their uncompressed state (e.g., in which the taper subsection 310 has not been mounted to the inlet head 200, etc.).

One or more optionally annular shims 349 are optionally disposed on the annular mounting plate 342-2. In alternative embodiments, the mounting plate 342-2 and shim 349 may comprise portions of a unitary structure. In the uncompressed state of the mounting flange 312 (e.g., in which the taper subsection 310 has not been mounted to the inlet head 200, etc.), the upper surface 313 of the mounting flange 312 is optionally disposed higher than an upper surface of an adjacent annular shim by a height Hg. The annular shim 349 optionally contacts another annular shim when the taper subsection 310 is mounted to the inlet head 200; in order to achieve this contact, the height Hs of the seals 317 is optionally reduced by compression of the seals 317 and/or the height Hg of the surface 313 is optionally reduced by compression of the mounting flange 312. Thus the height Hs and/or the height Hg are optionally selected to permit contact between adjacent shims 349 and/or between shims 349 and mounting plates 342. The height Hs and/or the height Hg are also optionally selected such that the installation compression (e.g., the compression to achieve contact between shims 349 and/or between shims 349, etc.) and mounting plates 342 is not sufficient to plastically deform the seals 317 and/or the flange 312. In an exemplary embodiment, the height Hs is 1/16 inches and the height Hg is 0.028 inches. The height Hs is optionally less than the thickness of the mounting flange 312 (e.g., less than a third or less than a half of the thickness of the mounting flange 312, etc.). The height Hg is optionally less than the height Hs (e.g., approximately one-half of Hs, less than one half of Hs, approximately a third of Hs, etc.).

The seals 317 are optionally substantially semi-circular in cross-sectional profile in their uncompressed state. Upon being compressed during installation, the seals are optionally deformed (e.g., elastically, non-plastically, etc.) into a different cross-sectional profile (e.g., a substantially rectangular profile, etc.).

In some embodiments, other seals described herein (e.g., seals provided on the feed inlet, the inlet head core, each taper subsection and/or on the underflow outlet, etc.) may have the dimensions (e.g., height Hs, etc.) and characteristics (e.g., semi-circular uncompressed shape, etc.) of the seals 317 described above. In some embodiments, other mounting flanges described herein (e.g., mounting flanges provided on each taper subsection, etc.) may also extend upwardly from adjacent mounting structure (e.g., optionally annular shims, etc.) in their uncompressed state by a height (e.g., a height less than Hs such as Hg, etc.) as described above.

In alternative embodiments, the taper section may comprise a different number of taper subsections (e.g., 2 or 4, etc.) or may comprise a single section (e.g., a single unitary section, etc.). Although in the illustrated embodiment the taper subsections have a substantially constant taper angle, in alternative embodiments, the taper angle may vary between the taper subsection. In alternative embodiments, the taper subsections may be joined (and/or the taper section may be joined to the inlet head) differently than as illustrated in FIG. 4 (e.g., by welding or by latches or other suitable structure).

Figure 10:
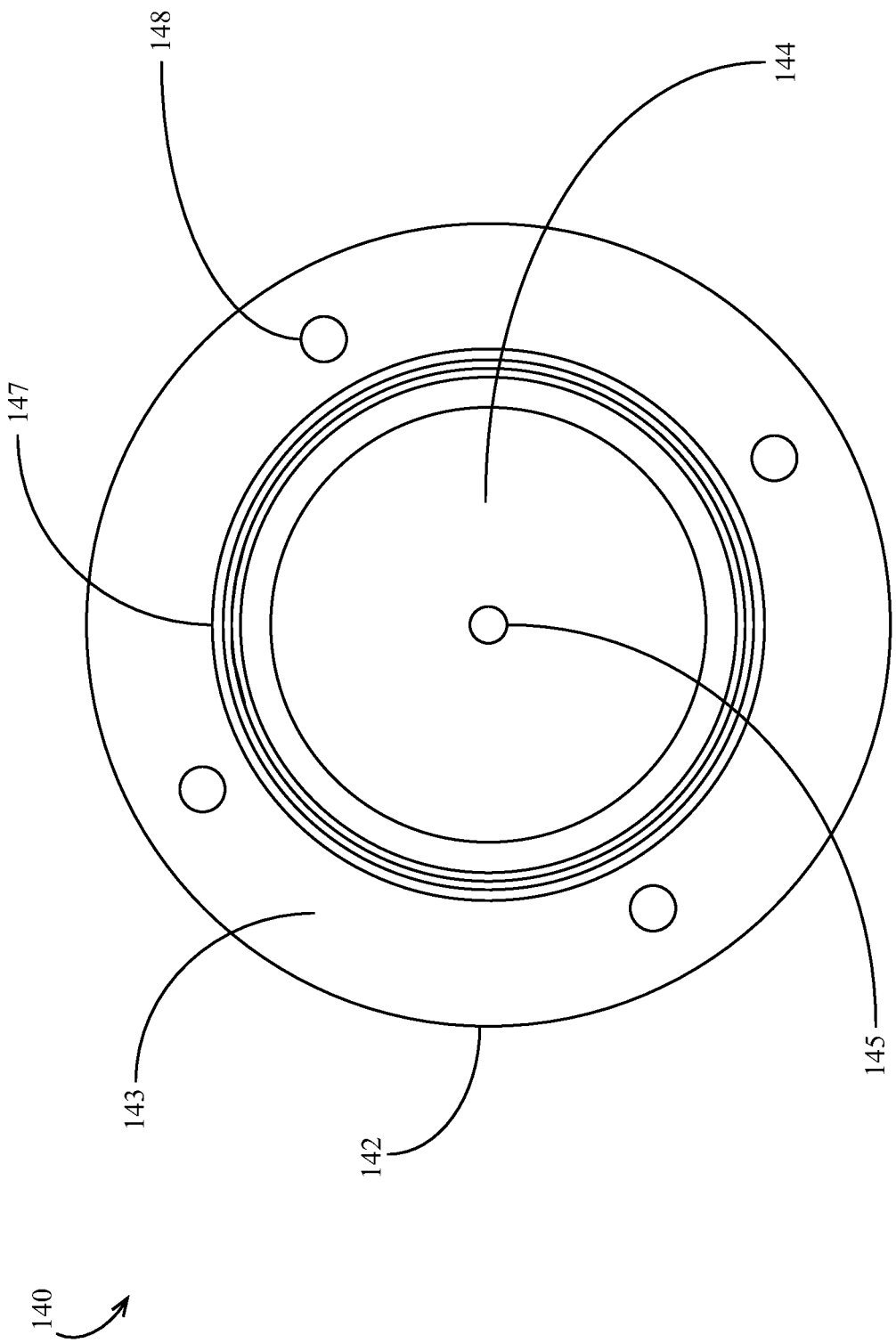
FIG. 10 is a plan view of an underflow outlet of the hydrocyclone of FIG. 1.

Referring to FIGS. 3 and 10, the underflow outlet 140 is optionally mounted to the taper section at a lower end thereof by a mounting arrangement 370 generally similar to the mounting arrangement 340. The underflow outlet 140 is optionally made of a polymer such as urethane.

The underflow outlet 140 optionally includes a mounting flange at an upper end thereof having a mounting surface 143 for forming a contact surface with a lower mounting flange of the taper section 300. The flange 142 may include mounting openings 148 for receiving bolts or other fastening devices of the mounting arrangement 370.

One or more seals 147 are optionally provided on the mounting surface 143. The seals 147 are optionally formed as a part with the mounting flange 142 (in other embodiments, the seals 147 may be additionally or alternatively formed as a part with the lower mounting flange of the taper section 300 or may comprise separate and/or separable sealing elements disposed between flanges). The seals 147 optionally each have a thickness (e.g., measured from the mating surface of the mounting flange 232) less than the thickness of the mounting flange 142 (e.g., less than a fifth of the mounting flange thickness or less than a tenth of the mounting flange thickness, etc.). Each seal 147 may be generally semi-circular in cross-section (e.g., when not compressed). In embodiments including multiple seals 147, the seals are optionally disposed in generally concentric fashion. Each seal 147 optionally contacts the lower flange of the taper section 300 when installed in order to form a sealed contact surface with the lower flange.

The underflow outlet 140 optionally comprises tapered inner sidewall 144 (e.g., forming a frustum, etc.). The upper end of the inner sidewall 144 optionally comprises an opening through which material is exchanged between the underflow outlet 140 and the taper section 300. The lower end of the inner sidewall 144 optionally comprises the underflow outlet apex 145 through which materials escape the underflow outlet 140.

In some embodiments, a valve 150 such as a duckbill valve (e.g., made of rubber and having an elongated lower outlet) may be mounted to the underflow outlet at a lower end thereof (e.g., by one or more adjustable clamps 152 such as hose clamps, etc.) to modify the release of materials from the underflow outlet 140 as described further herein. In other embodiments, a splash skirt (e.g., made of metal, polymer or rubber, etc.) may be disposed around the apex 145. In still other embodiments, the underflow outlet 140 may simply release materials from the apex 145 into atmosphere.

Referring to FIGS. 1-3, the overflow discharge outlet 400 is described in more detail. The overflow discharge outlet 400 optionally includes an inlet pipe 410 for receiving overflow material. The inlet pipe 410 which is optionally removably coupled to and in fluid communication with the vortex finder 412. In the illustrated embodiment, the inlet pipe 410 is removably coupled to the vortex finder 412 by a mounting arrangement comprising an upper ring 416 having a radial array of mounting openings for receiving a plurality of threaded rods. The threaded rods are optionally screwed into threaded openings in a lower ring 226 which is optionally fixed (e.g., by welding and/or bolting, etc.) to the lid 220. Movement of the upper ring 416 toward lower ring 226 (e.g., by screwing nuts onto the top of the threaded rods, etc.) optionally compresses corresponding mounting flanges of the inlet pipe 410 and vortex finder 412 together, optionally creating a sealed contact surface.

Referring to FIG. 6, the vortex finder 412 optionally has an inner diameter Dv-i. The inner diameter Dv-i is optionally selected from among standard inner diameters of pipes having the material of the outlet pipe 430 (e.g., HDPE pipe, etc.) described below and/or downstream pipes coupled thereto. Additionally, the inner diameter Dv-i is optionally selected such that a ratio between Dv-i and the inlet head diameter Dc is within an operationally effective range (e.g., between 0.25 and 0.5, between 0.3 and 0.4, 0.35, approximately 0.35, 0.39, approximately 0.39, etc.). In an exemplary embodiment in which the vortex finder 412 (and/or the outlet pipe 430) are made of HDPE, the inlet head diameter Dc may be 24 inches while the inner diameter Dv-i may be equal to (or approximately equal to) 9.4 inches.

The overflow discharge outlet optionally includes an outlet pipe 430 in fluid communication with the inlet pipe 410 for receiving overflow material. In some embodiments, the outlet pipe 430 extends generally normal to the inlet pipe 410 (e.g., the outlet pipe 430 may extend generally horizontally as illustrated). The outlet pipe 430 is optionally coupled to the inlet pipe 410 via a T-joint 420, although in other embodiments the pipes 410, 430 may be coupled via a pipe elbow (e.g., 90 degree elbow, etc.) or other structure.

The outlet pipe 430 may be removably coupled to a downstream pipe for further processing and/or may deposit overflow materials into atmosphere. In the illustrated embodiment, the outlet pipe 430 is removably coupled to a connecting pipe 510. The outlet pipe 430 optionally includes a mounting flange 414 for mating the outlet pipe 430 to the connecting pipe 510 or other downstream pipe structure. The mounting flange 414 optionally forms a sealed contact surface with a corresponding mounting flange 514 provided on the connecting pipe 510. Flange plates 432, 512 are optionally mounted together (e.g., using bolts inserted in mounting openings which are optionally arranged on the flange plates) in order to compress together and optionally seal corresponding faces of the mounting flanges 414, 514.

In the illustrated embodiment, the connecting pipe 510 comprises a portion of a siphon 500. The siphon 500 optionally has outlet disposed lower than the underflow outlet 140 and/or the valve 150 or other outlet structure mounted beneath the underflow outlet 140. In operation, opening an air inlet valve (not shown) in fluid communication with an air inlet 522 to a selected extent optionally allows air to flow into the siphon 500. The selected state of the air inlet valve optionally determines the extent to which the valve 150 opens; for example, when the air inlet valve is closed and no air enters the air inlet 522, material traveling through the siphon 500 may create a vacuum inside the hydrocyclone 100 causing the valve 150 to close completely, while progressively opening the air inlet valve may allow the valve 150 to open to progressively greater extent, allowing progressively larger sizes and/or amounts of material to exit the valve 150. In other embodiments, the amount or size of materials allowed to exit the underflow may be modified by varying the size of the apex 145 (e.g., by removing a bottom portion of the underflow outlet 140 and/or by replacing the underflow outlet 140 with a different outlet having a differently-sized apex, etc.).

The siphon 500 optionally includes an elbow 520 coupled to the pipe 510. The elbow 520 optionally places the pipe 510 in fluid communication with a downwardly extending pipe 530 which is optionally coupled to the elbow 520 at an upper end thereof. An outlet Oo of pipe 530 is optionally disposed below the underflow outlet 140 and/or the valve 150. The elbow 520 is optionally in fluid communication with the air inlet 522 (e.g., via an opening formed in an upper surface of the elbow 520). In some embodiments, a reducer 540 is optionally coupled to the outlet of the pipe 530 (e.g., removably coupled using a hose clamp 532, etc.).

The overflow discharge outlet 400 optionally includes a panel 445 (e.g., an inspection panel and/or access panel, etc.). The panel 445 optionally permits inspection of an internal volume of the overflow discharge outlet 400. The panel 445 optionally permits inspection of internal volumes of the inlet head 200, the taper section 300, and/or the underflow outlet 140. The panel 445 is optionally selectively displaceable (e.g., removable) to permit inspection of and access to the inside of the hydrocyclone 100; in some embodiments, the panel 445 may additionally be at least partially transparent to allow inspection without removal of the panel 445. The panel 445 is optionally disposed along the central axis Ac of the hydrocyclone 100.

In the illustrated embodiment, the panel 445 is removably mounted to the pipe 440. The pipe 440 (e.g., a central axis thereof and/or an upper opening thereof) is optionally aligned with the vortex finder 412 (e.g., a central axis thereof); for example, the pipe 440 is optionally intersected by a vertical axis (e.g., hydrocyclone central axis Ac) which intersects the vortex finder 412. The panel 445 is optionally removably mounted to pipe 440 by attaching (e.g., bolting) the panel 445 to a flange plate 444 such that the flange plate 444 and panel 445 are secured to a mounting flange 442 provided on (e.g., formed as a part with) the pipe 440. The panel 445 optionally forms a sealed contact surface with the pipe 440 (e.g., with the mounting flange 442) such that materials being processed do not escape an upper end of the pipe 440. In alternative embodiments, the panel 445 may be selectively secured to the pipe 440 using a hinge or sliding coupling in conjunction with a latch or other suitable device.

The pipes of the overflow discharge outlet 400 optionally comprise a polymer such as HDPE. An inner diameter of the pipes (e.g., the inner diameter Do-i of the pipe 430) is optionally a standard inner diameter of HDPE pipe; in some embodiments, the inner diameter Do-i is equal to or approximately equal to the inner diameter Dv-i of the vortex finder 412.

Ranges recited herein are intended to inclusively recite all values within the range provided in addition to the maximum and minimum range values. Headings used herein are simply for convenience of the reader and are not intended to be understood as limiting or used for any other purpose.

Figure 16:
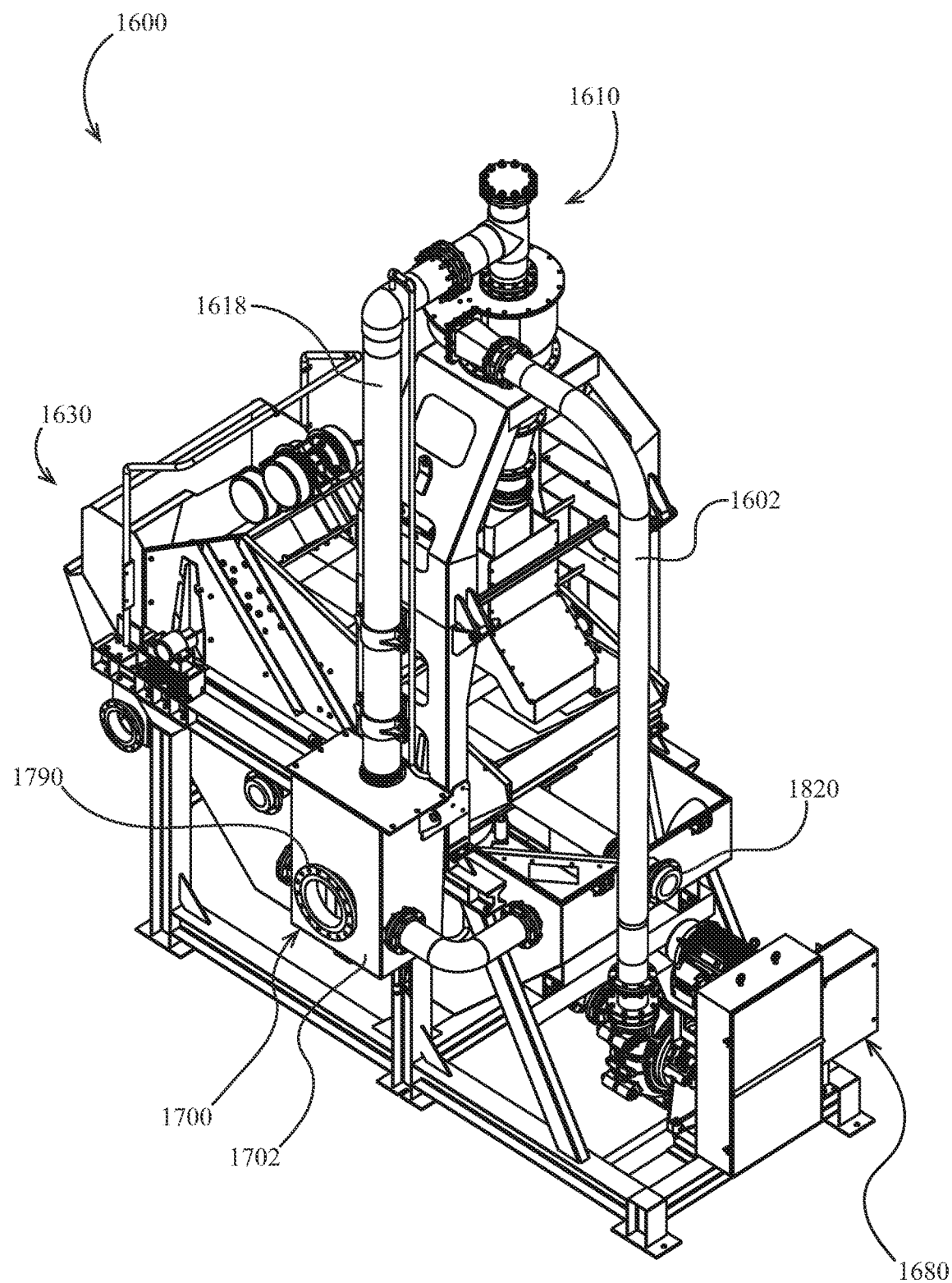
FIG. 16 is a perspective view of an embodiment of a plant incorporating an embodiment of a hydrocyclone.
Figure 17:
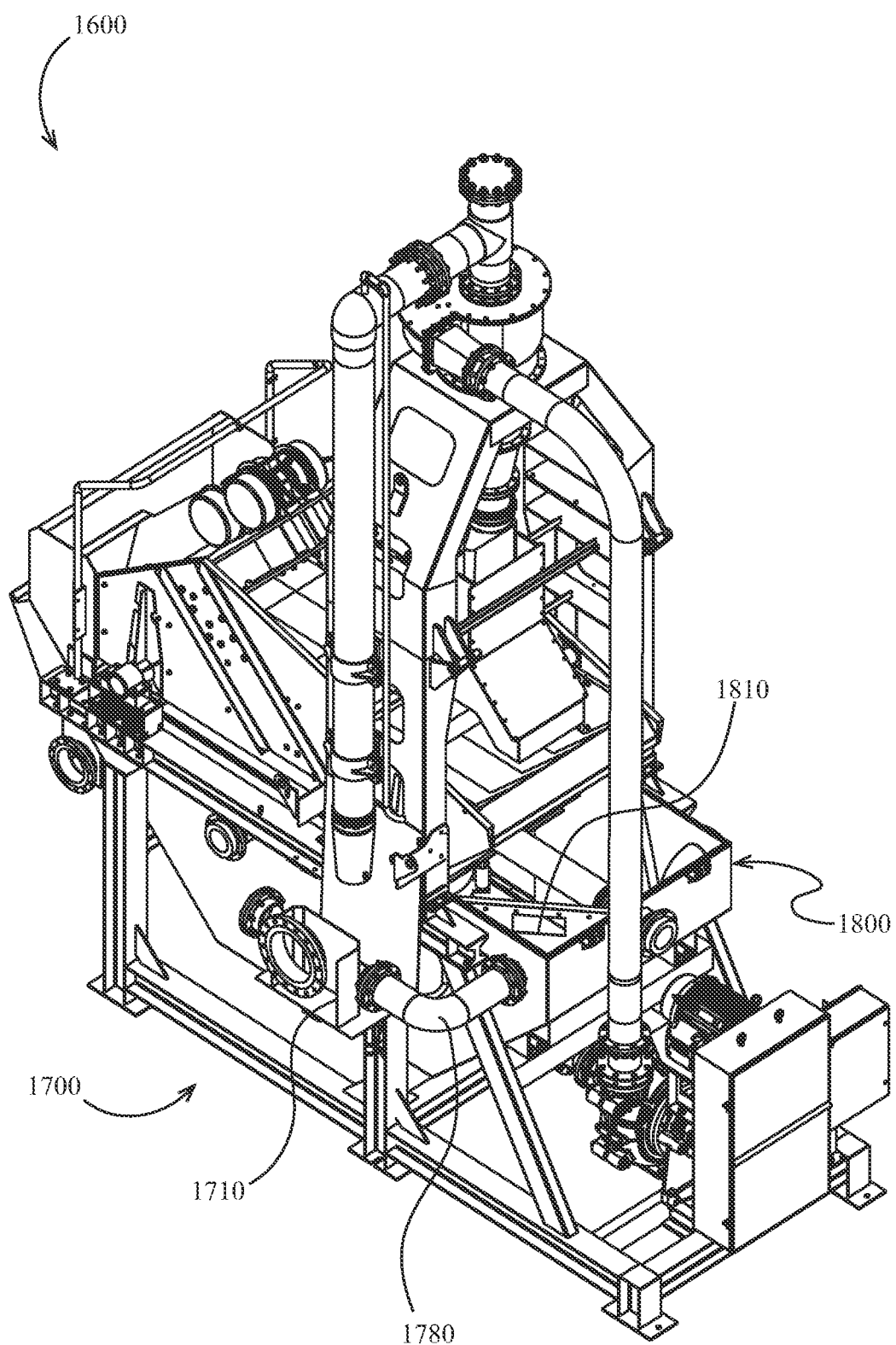
FIG. 17 is a perspective view of the plant of FIG. 16 with certain components not shown for clarity.
Figure 18:
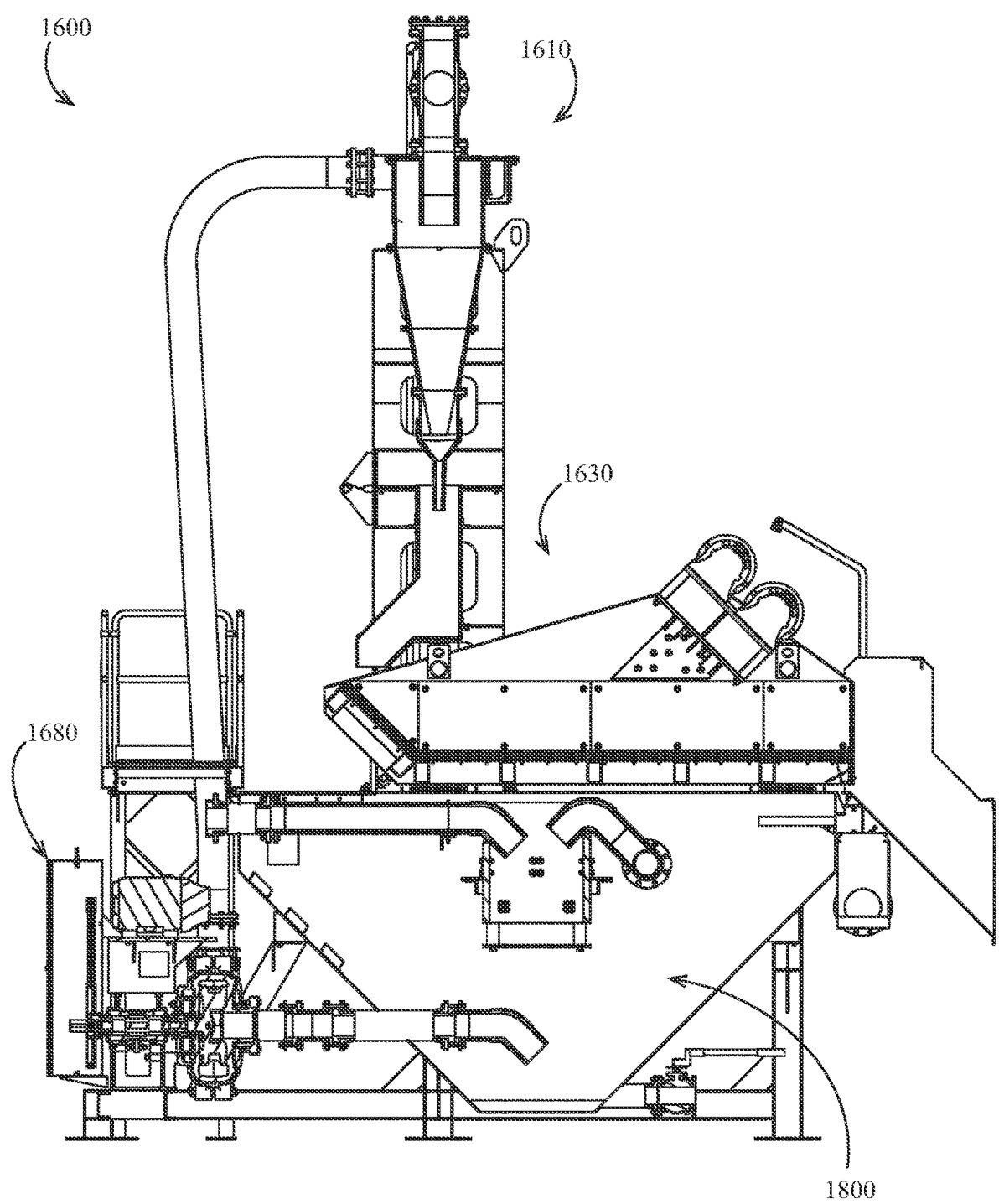
FIG. 18 is a sectional view along the section B-B of FIG. 19.
Figure 19:
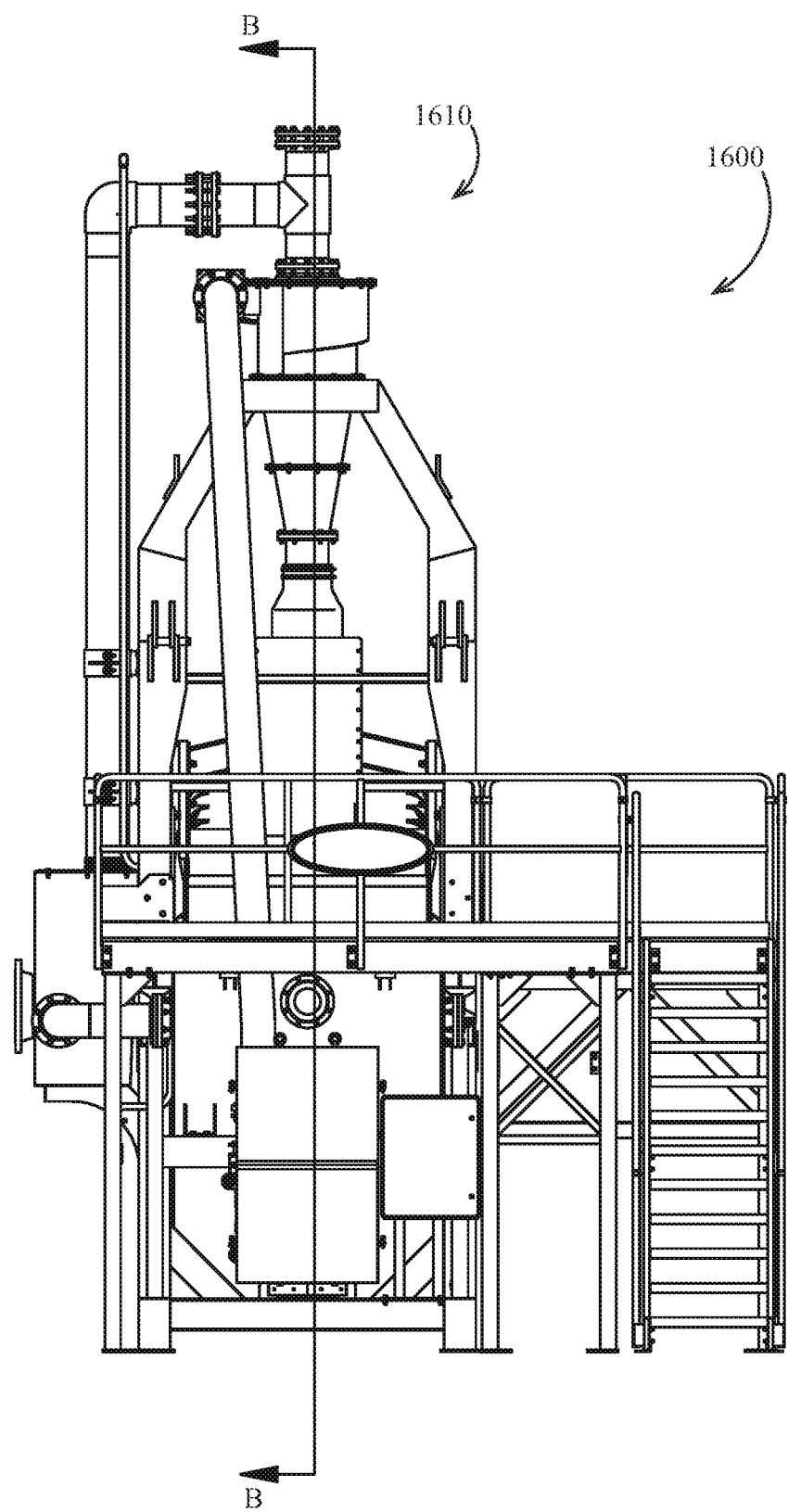
FIG. 19 is a front elevation view of the plant of FIG. 16.

Referring to FIGS. 16 and 17, a plant 1600 incorporating a hydrocyclone 1610 is illustrated from a perspective view. In some embodiments, the hydrocyclone 1610 comprises any hydrocyclone embodiment described herein. The plant 1600 generally comprises the hydrocyclone 1610, a sump 1800, a pump 1680, and a classifier 1630 (e.g., a vibratory screen such as a dewatering screen having one or more decks of horizontal or inclined screening media according to various embodiments, etc.).

In operation of some embodiments, an aggregate slurry enters an inlet 1820 and is deposited (e.g., via a feed well, etc.) into the sump 1800. The pump 1680 optionally pumps aggregate slurry from the sump 1800 (e.g., from a lower volume thereof, etc.) into an inlet of the hydrocyclone 1610 (e.g., via a conduit 1602 such as a pipe, etc.). An underflow outlet of the hydrocyclone 1610 optionally deposits underflow from the hydrocyclone onto the classifier 1630 and/or other equipment for further processing and/or transport. An overflow outlet of the hydrocyclone 1610 is optionally in fluid communication with a conduit 1618 such as a pipe.

The overflow outlet of the hydrocyclone 1610 optionally communicates aggregate slurry (e.g., overflow aggregate slurry) to an overflow container 1700 (e.g., temporary overflow container). The overflow container 1700 optionally includes an outlet 1790 for transfer of overflow aggregate slurry to storage and/or other equipment for processing, transfer, and/or storage. The overflow container 1700 is optionally in fluid communication with the sump 1800 (e.g., via a conduit 1780).

Referring to FIG. 17, in which a housing 1702 (e.g., comprising sidewalls or other structure) of the overflow container 1700 is not shown, a first weir 1710 is optionally disposed within the overflow container 1700. The first weir 1710 optionally substantially isolates water (e.g., below a first weir height thereof) from the outlet 1790. Thus overflow aggregate material communicated to the overflow container 1700 is communicated to the sump 1800 (e.g., recycled) until the overflow aggregate material in the overflow container 1700 exceeds the first overflow height of the first weir 1710. Overflow aggregate material in the overflow container 1700 exceeding the first weird height passes over the first weir 1710 and communicated out of the outlet 1790.

Recycled aggregate material communicated from the overflow container 1700 to the sump 1800 is contained behind a second weir 1810 disposed in the sump 1800 until the recycled aggregate material exceeds a second weir height of the second weir 1810. Recycled aggregate material exceeding the second weir height passes over the second weir 1810 into a primary interior volume of the sump 1800 (e.g., the interior volume from which the pump 1680 communicates aggregate material into the hydrocyclone 1610). The second weir 1810 may comprise a wall disposed in the sump 1800. In some embodiments such as the illustrated embodiment, the second weir height is the height of a lower edge of an opening in the second weir 1810; in other embodiments, the second weir height is the height of an upper edge of the second weir 1810.

In some embodiments, the first weir height is equal or approximately equal to (e.g., within 1 inch, ½ inch, or ¼ inch of, etc.) the second weir height. In other embodiments, the first weir height is greater than (more than 1 inch, more than 2 inches, more than 3 inches or more than 5 inches greater than, etc.) the second weir height. In still other embodiments, the second weir height is greater than (more than 1 inch, more than 2 inches, more than 3 inches or more than 5 inches greater than, etc.) the first weir height. In yet other embodiments, the first weir and/or the second weir are vertically adjustable such that the first and/or second weir heights may be adjusted.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A hydrocyclone for classifying aggregate material, comprising:
a feed inlet; and
an inlet head in fluid communication with said feed inlet, said inlet head comprising:
a generally cylindrical body portion, said body portion having a central vertical axis; and
a spiral inlet in fluid communication with said body portion via a body inlet, said body inlet comprising a terminal end of said spiral inlet, said spiral inlet having an inlet width measured between a first sidewall of said spiral inlet and a second sidewall of said spiral inlet, said spiral inlet having an inlet height measured between a lower surface of said spiral inlet and an upper surface of said spiral inlet, said spiral inlet having a cross-sectional inlet area along a plane extending through said central vertical axis, wherein an inlet angle is measured about said central vertical axis from an inlet opening of said spiral inlet along a travel direction of aggregate material entering said spiral inlet, said inlet area varying by less than 25% with said inlet angle, wherein said inlet height increases by more than 50% with said inlet angle, wherein said inlet width decreases by more than 50% with said inlet angle;
a vortex finder extending at least partially into said body portion of said inlet head, wherein said vortex finder has a vortex finder diameter, wherein said inlet head has an inlet head diameter, wherein a ratio of said vortex finder diameter to said inlet head diameter is between 0.25 and 0.5;
an overflow outlet in fluid communication with said vortex finder; and
an underflow outlet in fluid communication with said body portion of said inlet head, said underflow outlet disposed beneath said body portion.

2. The hydrocyclone of claim 1, wherein said inlet area varies parabolically with said inlet angle.

3. The hydrocyclone of claim 1, wherein said inlet area increases with said inlet angle from said inlet opening to a threshold value of said inlet angle, and wherein said inlet area decreases with said inlet angle from said threshold value of said inlet angle to said body inlet.

4. The hydrocyclone of claim 1, wherein said body portion of said inlet head comprises a first mounting surface, further comprising:
a taper subsection having a second mounting surface, wherein said first and second mounting surfaces are mounted together to form a continuous contact area; and
a seal provided on one of said first and second mounting surfaces, the seal having a compressed state and an uncompressed state, wherein said seal prevents escape of materials from said contact area.

5. The hydrocyclone of claim 1, wherein said feed inlet comprises a feed inlet opening and a feed inlet outlet opening, wherein said feed inlet opening has a different cross-section than said feed inlet outlet opening, and wherein said feed inlet opening has an inner diameter corresponding to a standard inner diameter for a pipe made of a second material, wherein said second material comprises a standard pipe material.

6. The hydrocyclone of claim 5, wherein said first material comprises urethane, and wherein said second material comprises high-density polyethylene.

7. The hydrocyclone of claim 1, wherein a ratio of said inlet height to said inlet width at said body inlet is between 2.8 and 3.2.

8. The hydrocyclone of claim 1, wherein said vortex finder is in fluid communication with an overflow outlet, wherein said overflow outlet comprises:
an inlet pipe, said inlet pipe being aligned with said vortex finder.

9. The hydrocyclone of claim 1, wherein said feed inlet is made of a first material, said feed inlet having a feed inlet opening and a feed inlet outlet opening, wherein said feed inlet opening has a different cross-section than said feed inlet outlet opening, and wherein said feed inlet opening has an inner diameter corresponding to a standard inner diameter for a pipe made of a second material, wherein said second material comprises a standard pipe material;
a vortex finder extending at least partially into said body portion of said inlet head;
an overflow outlet in fluid communication with said vortex finder; and
an underflow outlet in fluid communication with said body portion of said inlet head, said underflow outlet disposed beneath said body portion.

10. The hydrocyclone of claim 9, wherein a ratio of said inlet height to said inlet width at said body inlet is between 2.8 and 3.2.

11. The hydrocyclone of claim 9, wherein said inlet height increases with said inlet angle.

12. The hydrocyclone of claim 9, wherein said inlet width decreases with said inlet angle.

13. The hydrocyclone of claim 9, wherein said body portion of said inlet head comprises a first mounting surface, wherein said hydrocyclone further comprises:
a taper subsection having a second mounting surface, wherein said first and second mounting surfaces are mounted together to form a continuous contact area; and
a seal provided on one of said first and second mounting surfaces, the seal having a compressed state and an uncompressed state, wherein said seal prevents escape of materials from said contact area.

14. The hydrocyclone of claim 9, wherein said vortex finder is in fluid communication with an overflow outlet, wherein said overflow outlet comprises:
an inlet pipe, said inlet pipe being aligned with said vortex finder.

15. The hydrocyclone of claim 9, wherein said first material comprises urethane.

16. The hydrocyclone of claim 9, wherein said second material comprises high-density polyethylene.

* * * * *

UNITED STATES PATENT AND TRADEMARK OFFICE
CERTIFICATE OF CORRECTION

| | |
|---|---|
| PATENT NO. | : 11,845,088 B2 |
| APPLICATION NO. | : 17/304680 |
| DATED | : December 19, 2023 |
| INVENTOR(S) | : Lafe Grimm, Shane Hanson and Paul Ilott |

It is certified that error appears in the above-identified patent and that said Letters Patent is hereby corrected as shown below:

On the Title Page

Column 1, (72) Inventors after "Ilott," change the city by deleting "Tyler" and inserting -- Crowley --.

Signed and Sealed this
Thirteenth Day of February, 2024

Katherine Kelly Vidal
*Director of the United States Patent and Trademark Office*